US011496972B2

(12) United States Patent
Guo et al.

(10) Patent No.: US 11,496,972 B2
(45) Date of Patent: Nov. 8, 2022

(54) INFORMATION RECEIVING METHOD AND APPARATUS

(71) Applicant: Huawei Technologies Co., Ltd., Shenzhen (CN)

(72) Inventors: Zhiheng Guo, Beijing (CN); Yi Long, Beijing (CN); Zukang Shen, Beijing (CN); David Jean-Marie Mazzarese, Beijing (CN); Wenping Bi, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/881,936

(22) Filed: May 22, 2020

(65) Prior Publication Data

US 2020/0322900 A1 Oct. 8, 2020

Related U.S. Application Data

(63) Continuation of application No. PCT/CN2018/117302, filed on Nov. 23, 2018.

(30) Foreign Application Priority Data

Nov. 25, 2017 (CN) .......................... 201711198374.9

(51) Int. Cl.
*H04W 52/36* (2009.01)
*H04W 52/14* (2009.01)
*H04W 72/04* (2009.01)

(52) U.S. Cl.
CPC ......... *H04W 52/36* (2013.01); *H04W 52/146* (2013.01); *H04W 72/042* (2013.01); *H04W 72/0473* (2013.01)

(58) Field of Classification Search
CPC . H04W 52/36; H04W 52/146; H04W 72/042; H04W 72/0473
See application file for complete search history.

(56) References Cited

U.S. PATENT DOCUMENTS

2015/0327280 A1   11/2015   Zhang et al.
2016/0128004 A1   5/2016    Lee et al.
2018/0124710 A1*  5/2018    Ly .................... H04W 72/0413

FOREIGN PATENT DOCUMENTS

CN   104956644 A   9/2015
CN   105493420 A   4/2016
(Continued)

OTHER PUBLICATIONS

Intel Corp. "Remaining Aspects of Power Sharing between LTE and NR",3GPP DRAFT;R1-1720105,Reno,NV,USA,Nov. 27, 2017, pp. 3, vol. RAN WG1, Nov. 27, 2017-Dec. 1, 2017, XP051369786, Retrieved from Internet: URL:http://www.3gpp.org/ftp/tsg%5Fran/WG1%5FRL1/TSGR1%5F91/Docs/ [retrieved on Nov. 18, 2017] (Year: 2017).*

(Continued)

*Primary Examiner* — Yuwen Pan
*Assistant Examiner* — Angelica M Perez
(74) *Attorney, Agent, or Firm* — Slater Matsil, LLP

(57) ABSTRACT

An information receiving method and an apparatus are disclosed. The method includes: receiving, by a terminal device, first power information and second power information from a network device; and determining a first maximum transmission power based on the first power information, and determining a second maximum transmission power based on the second power information, where the first maximum transmission power is a maximum transmission power to be used by the terminal device for transmitting a signal by a first radio access technology, and the second maximum transmission power is a maximum transmission (Continued)

power to be used by the terminal device for transmitting a signal by a second radio access technology.

17 Claims, 12 Drawing Sheets

(56) References Cited

FOREIGN PATENT DOCUMENTS

| | | | | |
|---|---|---|---|---|
| CN | 106134263 A | 11/2016 | | |
| CN | 106165501 A | 11/2016 | | |
| CN | 107113740 A | 8/2017 | | |
| CN | 108990153 A | * 12/2018 | ............ | H04B 1/525 |
| WO | 2014109687 A1 | 7/2014 | | |
| WO | 2015116866 A1 | 8/2015 | | |
| WO | 2017135044 A1 | 8/2017 | | |
| WO | WO-2018072812 A1 | * 4/2018 | ........ | H04W 72/1215 |
| WO | WO-2018088953 A1 | * 5/2018 | .......... | H04W 52/281 |
| WO | WO-2018229837 A1 | * 12/2018 | ............ | H04W 16/32 |

OTHER PUBLICATIONS

Interdigital Inc., "Power Sharing Mechanism with LTE-NR DC and NR", 3GPP TSG RAN WG1#90 R1-1714118, Prague, Czech Republic, Aug. 21-25, 2017, pp. 7. (Year: 2017).*

Ericsson, "Power Sharing for L TE-NR Dual connectivity", 3GPP TSG-RAN WG1 #90 R1-1714460,Prague, Czech Republic, Aug. 21-25, 2017, 3 pages.

Huawei et al., "TP for power control for EN-DC in TS38.213", 3GPP TSG RAN WGI Meeting #92 R1-1801803, Athens, Greece, Feb. 26-Mar. 2, 2018, 4 pages.

Interdigital Inc., "Power Sharing Mechanisms with LTE-NR DC and NR", 3GPP TSG RAN WG1#90 R1-1714118, Prague, Czech Republic, Aug. 21-25, 2017, 7 pages.

Intel Corp., "Remaining aspects on power sharing between LTE and NR," 3GPP TSG-RAN WG1 #91, R1-1720105, Reno, NV, USA, Nov. 27-Dec. 1, 2017, 3 pages.

3rd Generation Partnership Project;Technical Specification Group Radio Access Network; Evolved Universal Terrestrial Radio Access (E-UTRA);User Equipment (UE) radio transmission and reception (Release 15), 3GPP TS 36.101 V15.0.0 (Sep. 2017), 1548 pages.

3rd Generation Partnership Project;Technical Specification Group Radio Access Network; Evolved Universal Terrestrial Radio Access (E-UTRA); Physical layer procedures (Release 14), 3GPP TS 36.213 V14.4.0 (Sep. 2017), 461 pages.

3rd Generation Partnership Project; Technical Specification Group Radio Access Network; NR; Physical layer procedures for control (Release 15), 3GPP TS 38.213 V1.2.0 (Nov. 2017), 38 pages.

3rd Generation Partnership Project;Technical Specification Group Radio Access Network; NR; User Equipment (UE) radio transmission and reception; Part 3: Range 1 and Range 2 Interworking operation with other radios (Release 15), 3GPP TS 38.101-3 V0.1.0 (Oct. 2017), 13 pages.

Interdigital, Inc., "Power Sharing Mechanisms with LTE-NR DC and NR DC", 3GPP TSG RAN WG1 NR Ad-Hoc#2, R1-1710879, Qingdao, P.R. China, Jun. 27-30, 2017, 7 pages.

Oppo, "Discussion on Remaining issues for LTE-NR Dual Connectivity", 3GPP TSG RAN WG1 Meeting 91, R1-1719989, Nov. 27-Dec. 1, 2017, 4 pages, Reno, USA.

* cited by examiner

INFORMATION RECEIVING METHOD AND APPARATUS

CROSS-REFERENCE TO RELATED APPLICATIONS

This application is a continuation of International Application No. PCT/CN2018/117302, filed on Nov. 23, 2018, which claims priority to Chinese Patent Application No. 201711198374.9, filed on Nov. 25, 2017. The disclosures of the aforementioned applications are hereby incorporated by reference in their entireties.

TECHNICAL FIELD

The present invention relates to the field of communications technologies, and in particular, to an information receiving method and an apparatus.

BACKGROUND

In a wireless communications system, a terminal device and a network transmit data to each other based on a radio communications technology. Before transmitting data, the terminal device usually needs to first access the network, to establish a connection to the network. Without loss of generality, the connection between the terminal device and the network may be briefly denoted by a link. Two endpoints of a link are used to represent two devices for sending and receiving data respectively. One endpoint represents a device using a network service, for example, the terminal device; and the other endpoint represents a device providing the network service, for example, a base station. A connection line between the two endpoints is used to represent a path for data transmission. Based on a direction of the data transmission, the link is classified into an uplink (UL) and a downlink (DL).

With continuous development and evolution of the wireless communications technology, operating bands in 4G LTE have been stipulated in a technical specification of the Third Generation Partnership Project (3GPP), and a technical specification of a 5G mobile communications system is under research and formulation. Transmission schemes and operating bands in 5G need to be re-designed compared with those in 4G. Therefore, a 5G radio technology is referred to as 5G new radio (NR) in 3GPP research projects, and sometimes also referred to as a 5G air interface.

A 5G NR system supports a terminal device that operates in LTE-NR dual connectivity (DC) mode. That is, the terminal device can operate in both an LTE system and the 5G NR system. A typical deployment manner is that NR is deployed on a time division duplex (TDD) carrier at a 3.5 GHz frequency, and LTE is deployed on a frequency division duplex (FDD) carrier at a 1.8 GHz frequency. In LTE-NR DC operation mode, the terminal device may transmit an uplink signal by using both the NR technology and an LTE technology. However, due to a limited transmission power of the terminal device, if a sum of a transmission power of the terminal device using the LTE technology and a transmission power of the terminal device using the NR technology exceeds a maximum transmission power of the terminal device, the terminal device may not normally transmit a signal. Therefore, how to control the transmission power of the terminal device using the NR technology and the transmission power of the terminal device using the LTE technology needs to be further studied.

SUMMARY

This application provides an information receiving method, to resolve a technical problem that a terminal device cannot normally transmit a signal because a sum of a transmission power of an LTE technology and a transmission power of an NR technology is used may exceed a maximum transmission power of the terminal device.

According to a first aspect, this application provides an information receiving method, including: receiving, by a terminal device, first power information and second power information from a network device; and determining, by the terminal device, a first maximum transmission power based on the first power information, and determining a second maximum transmission power based on the second power information, where the first maximum transmission power is a maximum transmission power to be used by the terminal device for transmitting a signal by a first radio access technology, and the second maximum transmission power is a maximum transmission power to be used by the terminal device for transmitting a signal by a second radio access technology.

In a possible design, the method further includes: receiving, by the terminal device, first indication information from the network device, where the first indication information indicates that the terminal device sends an uplink signal to the network device by using the first radio access technology and the second radio access technology in a time division multiplex TDM manner.

In this way, the network device indicates, by using the first indication information, the terminal device to send an uplink signal to the network device by using the first radio access technology and the second radio access technology in the TDM manner, thereby effectively avoiding a technical problem that the terminal device cannot normally transmit a signal because a sum of a transmission power when the first radio access technology is used and a transmission power when the second radio access technology is used may exceed a maximum transmission power of the terminal device.

In a possible design, the method further includes: in response to the first indication information, determining, by the terminal device based on the first power information, a transmission power of sending an uplink signal to the network device by using the first radio access technology, and/or determining, based on the second power information, a transmission power of sending an uplink signal to the network device by using the second radio access technology.

In this way, the terminal device may independently determine the transmission power of sending an uplink signal to the network device by using the first radio access technology and the transmission power of sending an uplink signal to the network device by using the second radio access technology, thereby avoiding a problem in the prior art that the transmission power of sending an uplink signal to the network device by using the first radio access technology and/or the transmission power of sending an uplink signal to the network device by using the second radio access technology may be limited because both the transmission power at which the terminal device is configured to send an uplink signal to the network device by using the first radio access technology and the transmission power at which the terminal device is configured to send an uplink signal to the network device by using the second radio access technology need to be mutually considered.

In a possible design, the method further includes: receiving, by the terminal device, second indication information from the network device, where the second indication information includes a DL-reference UL/DL configuration, a reference time division duplex configuration, or a reference UL/DL configuration; and in response to the second indication information, determining, by the terminal device based on the first power information, a transmission power of sending an uplink signal to the network device by using the first radio access technology, and/or determining, based on the second power information, a transmission power of sending an uplink signal to the network device by using the second radio access technology.

In this way, the network device indicates, by using the second indication information, the terminal device to send an uplink signal to the network device by using the first radio access technology and the second radio access technology in the TDM manner, thereby effectively avoiding a technical problem that the terminal device cannot normally transmit a signal because a sum of a transmission power when the first radio access technology is used and a transmission power when the second radio access technology is used may exceed a maximum transmission power of the terminal device.

In a possible design, the determining, by the terminal device based on the first power information, a transmission power of sending an uplink signal to the network device by using the first radio access technology, and/or determining, based on the second power information, a transmission power of sending an uplink signal to the network device by using the second radio access technology includes: determining, by the terminal device based on the first maximum transmission power but not based on the second maximum transmission power, the transmission power of sending an uplink signal to the network device by using the first radio access technology; and/or determining, based on the second maximum transmission power but not based on the first maximum transmission power, the transmission power of sending an uplink signal to the network device by using the second radio access technology.

In a possible design, the method further includes: if determining that a sum of the first maximum transmission power and the second maximum transmission power is greater than a first threshold, determining, by the terminal device based on the first maximum transmission power but not based on the second maximum transmission power, a transmission power of sending an uplink signal to the network device by using the first radio access technology; and/or determining, based on the second maximum transmission power but not based on the first maximum transmission power, a transmission power of sending an uplink signal to the network device by using the second radio access technology.

In this way, when determining that the sum of the first maximum transmission power and the second maximum transmission power is greater than the first threshold, the terminal device sends an uplink signal to the network device by using the first radio access technology and the second radio access technology in the TDM manner, thereby effectively avoiding a technical problem that the terminal device cannot normally transmit a signal because the sum of the transmission power when the first radio access technology is used and the transmission power when the second radio access technology is used may exceed the maximum transmission power of the terminal device.

In a possible design, the method further includes: receiving, by the terminal device, third indication information from the network device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

In this way, the network device indicates, by using the third indication information, the terminal device to send an uplink signal to the network device by using the first radio access technology and the second radio access technology in the TDM manner, thereby effectively avoiding a technical problem that the terminal device cannot normally transmit a signal because a sum of a transmission power when the first radio access technology is used and a transmission power when the second radio access technology is used may exceed a maximum transmission power of the terminal device.

In a possible design, the method further includes: in response to the third indication information, determining, by the terminal device based on the first power information, a transmission power of sending an uplink signal to the network device in the first time period by using the first radio access technology, and/or determining, based on the second power information, a transmission power of sending an uplink signal to the network device in the second time period by using the second radio access technology.

In a possible design, the determining, by the terminal device based on the first power information, a transmission power of sending an uplink signal to the network device in the first time period by using the first radio access technology, and/or determining, based on the second power information, a transmission power of sending an uplink signal to the network device in the second time period by using the second radio access technology includes: determining, by the terminal device based on the first maximum transmission power but not based on the second maximum transmission power, the transmission power of sending an uplink signal to the network device in the first time period, and/or determining, based on the second maximum transmission power but not based on the first maximum transmission power, the transmission power of sending an uplink signal to the network device in the second time period.

In a possible design, the method further includes: reporting, by the terminal device, an uplink power sharing capability of the terminal device to the network device, where the uplink power sharing capability includes supporting the sum of the first maximum transmission power and the second maximum transmission power greater than the first threshold, or not supporting the sum of the first maximum transmission power and the second maximum transmission power greater than the first threshold.

According to a second aspect, this application provides an information receiving method, including: determining, by a network device, first power information and second power information; and sending, by the network device, the first power information and the second power information to a terminal device, where the first power information is usable for the terminal device to determine a maximum transmit power for transmitting a signal by a first radio access technology, and the second power information is usable for the terminal device to determine a maximum transmission power for transmitting a signal by a second radio access technology.

In a possible design, the method further includes: sending, by the network device, first indication information to the terminal device, where the first indication information indicates that the terminal device sends an uplink signal to the network device by using the first radio access technology and the second radio access technology in a time division multiplex TDM manner.

In this way, the network device indicates, by using the first indication information, the terminal device to send an uplink signal to the network device by using the first radio access technology and the second radio access technology in the TDM manner, thereby effectively avoiding a technical problem that the terminal device cannot normally transmit a signal because a sum of a transmission power when the first radio access technology is used and a transmission power when the second radio access technology is used may exceed a maximum transmission power of the terminal device.

In a possible design, the method further includes: sending, by the network device, second indication information to the terminal device, where the second indication information includes a DL-reference UL/DL configuration, a reference time division duplex configuration, or a reference UL/DL configuration; and in response to the second indication information, the second indication information is to be used by the terminal device to determine, based on the first power information, a transmission power of sending an uplink signal to the network device by using the first radio access technology, and/or determine, based on the second power information, a transmission power of sending an uplink signal to the network device by using the second radio access technology.

In a possible design, the method further includes: sending, by the network device, third indication information to the terminal device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

In a possible design, the method further includes: receiving, by the network device, an uplink power sharing capability of the terminal device that is reported by the terminal device, where the uplink power sharing capability includes supporting a sum of the first maximum transmission power and the second maximum transmission power greater than a first threshold, or not supporting a sum of the first maximum transmission power and the second maximum transmission power greater than the first threshold.

According to a third aspect, this application provides a communications apparatus, and the communications apparatus includes: a transceiver module, configured to receive first power information and second power information from a network device; a processing module, configured to: determine a first maximum transmission power based on the first power information, and determine a second maximum transmission power based on the second power information, where the first maximum transmission power is a maximum transmission power to be used by the terminal device for transmitting a signal by a first radio access technology, and the second maximum transmission power is a maximum transmission power to be used by the terminal device for transmitting a signal by a second radio access technology.

In a possible design, the transceiver module is further configured to: receive first indication information from the network device, where the first indication information indicates that the terminal device sends an uplink signal to the network device by using the first radio access technology and the second radio access technology in a TDM manner.

In a possible design, the processing module is further configured to: in response to the first indication information, determine, based on the first power information, a transmission power of sending an uplink signal to the network device by using the first radio access technology, and/or determine, based on the second power information, a transmission power of sending an uplink signal to the network device by using the second radio access technology.

In a possible design, the transceiver module is further configured to: receive second indication information from the network device, where the second indication information includes a DL-reference UL/DL configuration, a reference time division duplex configuration, or a reference UL/DL configuration; and the processing module is further configured to in response to the second indication information, determine, based on the first power information, a transmission power of sending an uplink signal to the network device by using the first radio access technology, and/or determine, based on the second power information, a transmission power of sending an uplink signal to the network device by using the second radio access technology.

In a possible design, the processing module is specifically configured to: determine, based on the first maximum transmission power but not based on the second maximum transmission power, the transmission power of sending an uplink signal to the network device by using the first radio access technology; and/or determine, based on the second maximum transmission power but not based on the first maximum transmission power, the transmission power of sending an uplink signal to the network device by using the second radio access technology.

In a possible design, the processing module is further configured to: if determining that a sum of the first maximum transmission power and the second maximum transmission power is greater than a first threshold, determine, based on the first maximum transmission power but not based on the second maximum transmission power, a transmission power of sending an uplink signal to the network device by using the first radio access technology; and/or determine, based on the second maximum transmission power but not based on the first maximum transmission power, a transmission power of sending an uplink signal to the network device by using the second radio access technology.

In a possible design, the transceiver module is further configured to: receive third indication information from the network device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

In a possible design, the processing module is further configured to: in response to the third indication information, determine, based on the first power information, a transmission power of sending an uplink signal to the network device in the first time period by using the first radio access technology, and/or determine, based on the second power information, a transmission power of sending an uplink signal to the network device in the second time period by using the second radio access technology.

In a possible design, the processing module is specifically configured to: determine, based on the first maximum transmission power but not based on the second maximum transmission power, the transmission power of sending an uplink signal to the network device in the first time period, and/or determine, based on the second maximum transmission power but not based on the first maximum transmission power, the transmission power of sending an uplink signal to the network device in the second time period.

In a possible design, the transceiver module is further configured to: report an uplink power sharing capability of the terminal device to the network device, where the uplink power sharing capability includes supporting the sum of the first maximum transmission power and the second maximum transmission power greater than the first threshold, or not supporting the sum of the first maximum transmission power and the second maximum transmission power greater than the first threshold.

According to a fourth aspect, this application provides a communications apparatus, including: a processing module, configured to determine first power information and second power information; and a transceiver module, configured to send the first power information and the second power information to a terminal device, where the first power information is usable for the terminal device to determine a maximum transmit power for transmitting a signal by a first radio access technology, and the second power information is usable for the terminal device to determine a maximum transmission power for transmitting a signal by a second radio access technology.

In a possible design, the transceiver module is further configured to: send first indication information to the terminal device, where the first indication information indicates that the terminal device sends an uplink signal to the network device by using the first radio access technology and the second radio access technology in a time division multiplex TDM manner.

In a possible design, the transceiver module is further configured to: send second indication information to the terminal device, where the second indication information includes a DL-reference UL/DL configuration, a reference time division duplex configuration, or a reference UL/DL configuration; and in response to the second indication information, the second indication information is to be used by the terminal device to determine, based on the first power information, a transmission power of sending an uplink signal to the network device by using the first radio access technology, and/or determine, based on the second power information, a transmission power of sending an uplink signal to the network device by using the second radio access technology.

In a possible design, the transceiver module is further configured to: send third indication information to the terminal device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

In a possible design, the transceiver module is further configured to: receive an uplink power sharing capability of the terminal device that is reported by the terminal device, where the uplink power sharing capability includes supporting a sum of the first maximum transmission power and the second maximum transmission power greater than a first threshold, or not supporting a sum of the first maximum transmission power and the second maximum transmission power greater than the first threshold.

According to a fifth aspect, this application provides a communications apparatus, the communications apparatus may be a terminal device, and the communications apparatus has a function of implementing the method example in the first aspect; and the communications apparatus includes: a communications module and a processor.

The communications module is configured to perform communication interaction with another device. The communications module may be an RF circuit, a Wi-Fi module, a communications interface, a Bluetooth module, or the like.

The processor is configured to implement the function of the processing module in the third aspect.

Optionally, the communications apparatus may further include: the memory, configured to store a program and the like. Specifically, the program may include program code, where the program code includes an instruction. The memory may include a random access memory (RAM), or may further include a non-volatile memory, such as at least one magnetic disk memory. The processor executes the application program stored in the memory, to implement the foregoing function.

In a possible manner, the communications module, the processor, and the memory may be connected to each other by using the bus; and the bus may be a peripheral component interconnect (PCI) bus, an extended industry standard architecture (EISA) bus, or the like. The bus may be classified into an address bus, a data bus, a control bus, and the like.

According to a sixth aspect, this application provides a communications apparatus, the communications apparatus may be a network device, and the communications apparatus has a function of implementing the method example in the second aspect; and the communications apparatus includes: a communications module and a processor.

The processor is configured to implement the function of the processing module in the fourth aspect.

The communications module is configured to perform communication interaction with another device.

The communications module may be an RF circuit, a Wi-Fi module, a communications interface, a Bluetooth module, or the like.

Optionally, the communications apparatus may further include: the memory, configured to store a program and the like. Specifically, the program may include program code, where the program code includes an instruction. The memory may include a RAM, and may further include a non-volatile memory, for example, at least one magnetic disk memory. The processor executes the application program stored in the memory, to implement the foregoing function.

In a possible manner, the communications module, the processor, and the memory may be connected to each other by using the bus; and the bus may be a PCI bus, an EISA bus, or the like. The bus may be classified into an address bus, a data bus, a control bus, and the like.

According to a seventh aspect, this application provides an information indication method, including: receiving, by a terminal device, fourth indication information from a network device, where the fourth indication information indicates a first bandwidth and first bandwidth location information, the first bandwidth includes a first radio frequency bandwidth or a first virtual bandwidth of the network device, and the first radio frequency bandwidth/the first virtual bandwidth includes a bandwidth sent/received by the network device; and determining, by the terminal device, a second radio frequency bandwidth/a filter bandwidth of the terminal device according to the fourth indication information, where the second radio frequency bandwidth includes a radio frequency bandwidth sent/received by the terminal device.

The bandwidth may refer to one of a quantity of subcarriers, a bandwidth value, and a quantity of physical resource blocks (PRB), and details are not limited.

In a possible design, the first bandwidth location information includes at least one of: a center frequency/a central PRB location/a central subcarrier location/a central absolute radio frequency channel number, a lowest frequency/a lowest PRB location/a lowest subcarrier location/a lowest absolute radio frequency channel number, and a highest frequency/a highest PRB location/a highest subcarrier location/a highest absolute radio frequency channel number of the first bandwidth.

The center frequency of the first bandwidth may refer to a center frequency value of the first bandwidth. The central PRB location may refer to a PRB number at a middle location of the first bandwidth, and if the middle location is between two PRBs, a larger PRB number may be selected. The central subcarrier location may refer to a subcarrier number at the middle location of the first bandwidth. The central absolute radio frequency channel number may be an absolute radio frequency channel number at the middle location of the first bandwidth. The lowest frequency may refer to a lowest frequency value of the first bandwidth. The lowest PRB location may refer to a minimum PRB number in the first bandwidth. The lowest subcarrier location may refer to a minimum subcarrier number in the first bandwidth. The lowest absolute radio frequency channel number may be a minimum absolute radio frequency channel number in the first bandwidth. The highest frequency may refer to a highest frequency value of the first bandwidth. The highest PRB location may refer to a maximum PRB number in the first bandwidth. The highest subcarrier location may refer to a maximum subcarrier number in the first bandwidth. The highest absolute radio frequency channel number may be a maximum absolute radio frequency channel number in the first bandwidth.

In a possible design, the determining, by the terminal device, a second radio frequency bandwidth of the terminal device according to the fourth indication information includes: determining, by the terminal device, a start frequency and an end frequency of the first bandwidth according to the fourth indication information; and determining, by the terminal device, that a start frequency of the second radio frequency bandwidth is greater than or equal to the start frequency of the first bandwidth, and an end frequency of the second radio frequency bandwidth is less than or equal to the end frequency of the first bandwidth.

According to an eighth aspect, this application provides an information indication method, including: determining, by a network device, fourth indication information, where the fourth indication information indicates a first bandwidth and first bandwidth location information, the first bandwidth includes a first radio frequency bandwidth or a first virtual bandwidth of the network device, and the first radio frequency bandwidth/the first virtual bandwidth includes a bandwidth sent/received by the network device; and sending, by the network device, the fourth indication information to the terminal device.

The bandwidth may refer to one of a quantity of subcarriers, a bandwidth value, and a quantity of physical resource blocks (PRB), and details are not limited.

In a possible design, the first bandwidth location information includes at least one of a center frequency/a central PRB location/a central subcarrier location/a central absolute radio frequency channel number, a lowest frequency/a lowest PRB location/a lowest subcarrier location/a lowest absolute radio frequency channel number, and a highest frequency/a highest PRB location/a highest subcarrier location/a highest absolute radio frequency channel number of the first bandwidth.

The center frequency of the first bandwidth may refer to a center frequency value of the first bandwidth. The central PRB location may refer to a PRB number at a middle location of the first bandwidth, and if the middle location is between two PRBs, a larger PRB number may be selected. The central subcarrier location may refer to a subcarrier number at the middle location of the first bandwidth. The central absolute radio frequency channel number may be an absolute radio frequency channel number at the middle location of the first bandwidth. The lowest frequency may refer to a lowest frequency value of the first bandwidth. The lowest PRB location may refer to a minimum PRB number in the first bandwidth. The lowest subcarrier location may refer to a minimum subcarrier number in the first bandwidth. The lowest absolute radio frequency channel number may be a minimum absolute radio frequency channel number in the first bandwidth. The highest frequency may refer to a highest frequency value of the first bandwidth. The highest PRB location may refer to a maximum PRB number in the first bandwidth. The highest subcarrier location may refer to a maximum subcarrier number in the first bandwidth. The highest absolute radio frequency channel number may be a maximum absolute radio frequency channel number in the first bandwidth.

According to a ninth aspect, this application provides an information indication method, including: sending, by a terminal device, fifth indication information to the network device, where the fifth indication information indicates a bandwidth supported by the terminal device, the bandwidth supported by the terminal device includes a radio frequency bandwidth sent/received by the terminal device, and the bandwidth supported by the terminal device includes one or more bandwidths; and receiving, by the terminal device, sixth indication information from the network device, where the sixth indication information indicates a radio frequency bandwidth to be used by the terminal device and a location of the radio frequency bandwidth.

The bandwidth may refer to one of a quantity of subcarriers, a bandwidth value, and a quantity of physical resource blocks (PRB), and details are not limited.

The location of the radio frequency bandwidth to be used by the terminal device may include at least one of a center frequency/a central PRB location/a central subcarrier location/a central absolute radio frequency channel number, a lowest frequency/a lowest PRB location/a lowest subcarrier location/a lowest absolute radio frequency channel number, and a highest frequency/a highest PRB location/a highest subcarrier location/a highest absolute radio frequency channel number of the radio frequency bandwidth.

The center frequency of the radio frequency bandwidth may refer to a center frequency value of the radio frequency bandwidth. The central PRB location may refer to a PRB number at a middle location of the radio frequency bandwidth, and if the middle location is between two PRBs, a larger PRB number may be selected. The central subcarrier location may refer to a subcarrier number at the middle location of the radio frequency bandwidth. The central absolute radio frequency channel number may be an absolute radio frequency channel number at the middle location of the radio frequency bandwidth. The lowest frequency may refer to a lowest frequency value of the radio frequency bandwidth. The lowest PRB location may refer to a minimum PRB number in the radio frequency bandwidth. The lowest subcarrier location may refer to a minimum subcarrier number in the radio frequency bandwidth. The lowest absolute radio frequency channel number may be a minimum absolute radio frequency channel number in the radio frequency bandwidth. The highest frequency may refer to a highest frequency value of the radio frequency bandwidth. The highest PRB location may refer to a maximum PRB number in the radio frequency bandwidth. The highest subcarrier location may refer to a maximum subcarrier number in the radio frequency bandwidth. The highest absolute radio frequency channel number may be a maximum absolute radio frequency channel number in the radio frequency bandwidth.

In a possible design, the sending, by a terminal device, fifth indication information to the network device includes: sending, by the terminal device, the fifth indication information to the network device by using an RRC message.

According to a tenth aspect, this application provides an information indication method, including: receiving, by a network device, fifth indication information sent by a terminal device, where the fifth indication information indicates a bandwidth supported by the terminal device, the bandwidth supported by the terminal device includes a radio frequency bandwidth sent/received by the terminal device, and the bandwidth supported by the terminal device includes one or more bandwidths; and sending, by the network device, sixth indication information to the terminal device according to the fifth indication information, where the sixth indication information indicates a radio frequency bandwidth to be used by the terminal device and a location of the radio frequency bandwidth.

The bandwidth may refer to one of a quantity of subcarriers, a bandwidth value, and a quantity of physical resource blocks (PRB), and details are not limited.

The location of the radio frequency bandwidth to be used by the terminal device may include at least one of a center frequency/a central PRB location/a central subcarrier location/a central absolute radio frequency channel number, a lowest frequency/a lowest PRB location/a lowest subcarrier location/a lowest absolute radio frequency channel number, and a highest frequency/a highest PRB location/a highest subcarrier location/a highest absolute radio frequency channel number of the radio frequency bandwidth.

The center frequency of the radio frequency bandwidth may refer to a center frequency value of the radio frequency bandwidth. The central PRB location may refer to a PRB number at a middle location of the radio frequency bandwidth, and if the middle location is between two PRBs, a larger PRB number may be selected. The central subcarrier location may refer to a subcarrier number at the middle location of the radio frequency bandwidth. The central absolute radio frequency channel number may be an absolute radio frequency channel number at the middle location of the radio frequency bandwidth. The lowest frequency may refer to a lowest frequency value of the radio frequency bandwidth. The lowest PRB location may refer to a minimum PRB number in the radio frequency bandwidth. The lowest subcarrier location may refer to a minimum subcarrier number in the radio frequency bandwidth. The lowest absolute radio frequency channel number may be a minimum absolute radio frequency channel number in the radio frequency bandwidth. The highest frequency may refer to a highest frequency value of the radio frequency bandwidth. The highest PRB location may refer to a maximum PRB number in the radio frequency bandwidth. The highest subcarrier location may refer to a maximum subcarrier number in the radio frequency bandwidth. The highest absolute radio frequency channel number may be a maximum absolute radio frequency channel number in the radio frequency bandwidth.

Another aspect of this application provides a communications apparatus, the communications apparatus may be a terminal device, and the communications apparatus has one or more function modules such as a transceiver module and a processing module, and is configured to implement the information indication method described in the seventh aspect or the ninth aspect.

Another aspect of this application provides a communications apparatus, the communications apparatus may be a network device, and the communications apparatus has one or more function modules such as a transceiver module and a processing module, and is configured to implement the information indication method described in the eighth aspect or the tenth aspect.

Another aspect of this application provides a communications apparatus, the communications apparatus may be a terminal device, and the communications apparatus has a function of implementing the method example in the seventh aspect or the ninth aspect; and the communications apparatus includes: a communications module and a processor.

The processor is configured to implement the function of the processing module in the fourth aspect.

The communications module is configured to perform communication interaction with another device.

The communications module may be an RF circuit, a Wi-Fi module, a communications interface, a Bluetooth module, or the like.

Optionally, the communications apparatus may further include: the memory, configured to store a program and the like. Specifically, the program may include program code, where the program code includes an instruction. The memory may include a RAM, and may further include a non-volatile memory, for example, at least one magnetic disk memory. The processor executes the application program stored in the memory, to implement the foregoing function.

In a possible manner, the communications module, the processor, and the memory may be connected to each other by using the bus; and the bus may be a PCI bus, an EISA bus, or the like. The bus may be classified into an address bus, a data bus, a control bus, and the like.

Another aspect of this application provides a communications apparatus, the communications apparatus may be a network device, and the communications apparatus has a function of implementing the method example in the eighth aspect or the tenth aspect; and the communications apparatus includes: a communications module and a processor.

The processor is configured to implement the function of the processing module in the fourth aspect.

The communications module is configured to perform communication interaction with another device.

The communications module may be an RF circuit, a Wi-Fi module, a communications interface, a Bluetooth module, or the like.

Optionally, the communications apparatus may further include: the memory, configured to store a program and the like. Specifically, the program may include program code, where the program code includes an instruction. The memory may include a RAM, and may further include a non-volatile memory, for example, at least one magnetic disk memory. The processor executes the application program stored in the memory, to implement the foregoing function.

In a possible manner, the communications module, the processor, and the memory may be connected to each other by using the bus; and the bus may be a PCI bus, an EISA bus, or the like. The bus may be classified into an address bus, a data bus, a control bus, and the like.

This application further provides a communications system. The system includes the terminal device provided in any one of the foregoing designs, and may further include the network device that is in the solutions provided in this application and that interacts with the terminal device.

This application further provides a computer storage medium, the storage medium stores a software program, and when read and executed by one or more processors, the software program is capable of implementing the information receiving method or the information indication method provided in the foregoing aspects or foregoing possible designs.

This application further provides a computer program product including an instruction, and when the computer program product is run on a computer, the computer is enabled to perform the information receiving method or the information indication method according to the foregoing aspects or the foregoing possible designs.

This application further provides a computer program, and when the computer program is run on a computer, the computer is enabled to perform the information receiving method or the information indication method according to the foregoing aspects or the foregoing possible designs.

DETAILED DESCRIPTION OF ILLUSTRATIVE EMBODIMENTS

The following specifically describes this application in detail with reference to the accompanying drawings of this specification.

Figure 1:
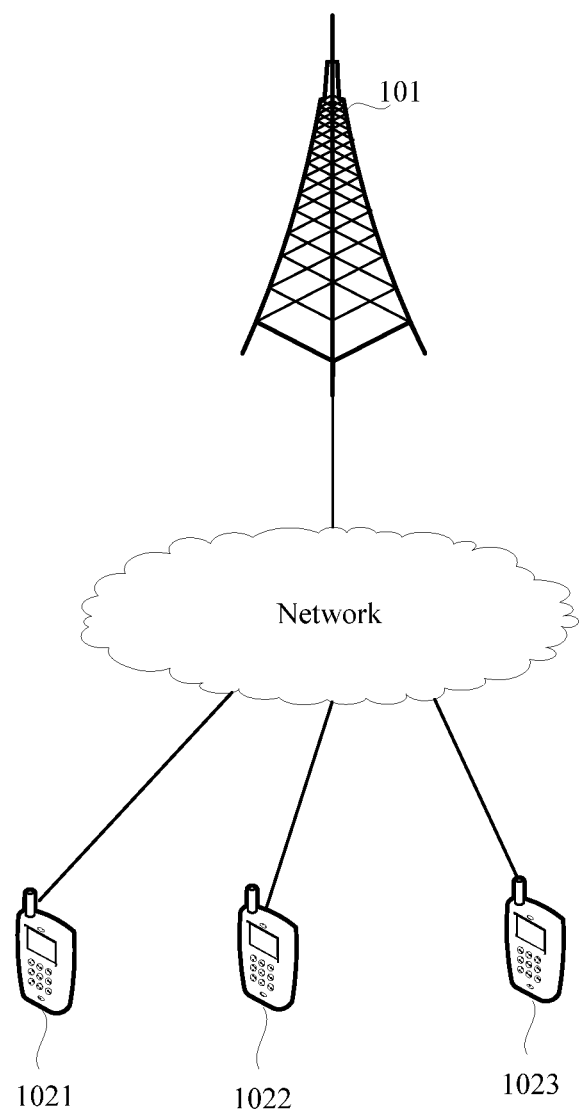
FIG. 1 is a schematic diagram of a system architecture to which this application is applicable.

FIG. 1 is a schematic diagram of a system architecture to which this application is applicable. As shown in FIG. 1, the system architecture includes a network device 101, and one or more terminal devices, for example, a terminal device 1021, a terminal device 1022, and a terminal device 1023 shown in FIG. 1. The network device 101 may transmit downlink data to the terminal device 1021, the terminal device 1022, and the terminal device 1023 over a network, and the terminal device 1021, the terminal device 1022, and the terminal device 1023 may transmit uplink data to the network device 101 over the network.

In this application, the network device may be a base station (BS). The base station device may also be referred to as a base station, and is an apparatus deployed in a radio access network to provide a wireless communication function. For example, a device providing a base station function in a 2G network includes a base transceiver station (BTS) and a base station controller (BSC); a device providing a base station function in a 3G network includes a NodeB and a radio network controller (RNC); a device providing a base station function in a 4G network includes an evolved NodeB (eNB); and a device providing a base station function in a 5G network includes a new radio NodeB (gNB), a centralized unit (CU), a distributed unit, and a new radio controller.

A terminal device is a device having a wireless receiving and sending function. The terminal device may be deployed on land, and includes an indoor or outdoor device, and a handheld device or a vehicle-mounted device; or may be deployed on water (for example, on a steamer); or may be deployed in air (for example, on an air plane, a balloon, and a satellite). The terminal device may be a mobile phone, a tablet computer (Pad), a computer having a wireless sending and receiving function, a virtual reality (VR) terminal device, an augmented reality (AR) terminal device, a wireless terminal device in industrial control (industrial control), a wireless terminal device in self driving, a wireless terminal device in telemedicine, a wireless terminal device in a smart grid, a wireless terminal device in transportation safety, a wireless terminal device in a smart city, a wireless terminal device in a smart home, or the like.

This application is described mainly by using the system architecture illustrated in FIG. 1 as an example, but this application is not limited thereto. For example, this application may also be applicable to a system architecture in which a macro base station communicates with a micro base station, and details are not limited.

A communications system to which the foregoing system architecture is applicable includes but is not limited to: time division duplex-long term evolution (TDD LTE), frequency division duplex-long term evolution (FDD LTE), long term evolution-advanced (LTE-A), and various future evolved wireless communications systems (for example, a 5G NR system).

In the system architecture shown in FIG. 1, for example, the terminal device 1021 operates in LTE-NR DC mode. It is assumed that at a certain moment, the terminal device 1021 transmits a first uplink signal to the network device 101 through LTE at a transmission power of P1, and transmits a second uplink signal to the network device 101 through NR at a transmission power of P2. If a sum of P1 and P2 is greater than a maximum transmission power (for example, 23 dBm) of the terminal device 1021, the terminal device 1021 may not normally transmit a signal.

To resolve this problem, in a manner, the terminal device configures that the sum of the transmission power when the LTE technology is used and the transmission power when the NR technology is used does not exceed the maximum transmission power of the terminal device. To be specific, during configuration of the transmission power when the LTE technology is used, the transmission power when the NR technology is used needs to be considered, and during configuration of the transmission power when the NR technology is used, the transmission power when the LTE technology is used needs to be considered. However, in such a manner, the transmission power when the LTE technology is used and/or the transmission power when the NR technology is used are/is limited, and consequently, coverage of the LTE-NR DC is limited. In addition, the foregoing configuration requires a sufficient processing capability of the terminal device, and for a terminal device that does not have the processing capability, the terminal device still may not normally transmit a signal.

Based on this, this application provides an information receiving method, and the method includes: receiving, by a terminal device, first power information and second power information from a network device, determining a first maximum transmission power based on the first power information, and determining a second maximum transmission power based on the second power information, where the first maximum transmission power is a maximum transmission power to be used by the terminal device for transmitting a signal by a first radio access technology, and the second maximum transmission power is a maximum transmission power to be used by the terminal device for transmitting a signal by a second radio access technology. In addition, the terminal device may send an uplink signal to the network device by using the first radio access technology and the second radio access technology in a time division multiplex (TDM) manner, thereby effectively avoiding a technical problem that the terminal device cannot normally transmit a signal because a sum of a transmission power when the first radio access technology is used and a transmission power when the second radio access technology is used may exceed a maximum transmission power of the terminal device.

In this application, that the terminal device sends an uplink signal to the network device by using the first radio access technology and the second radio access technology in the TDM manner may also be understood as follows: The terminal device sends an uplink signal to the network device by using the first radio access technology and the second radio access technology in a manner in which a power is not shared, or a transmission power of the terminal device when the first radio access technology is used and a transmission power of the terminal device when the second radio access technology is used do not affect each other, or sending is performed by using the first radio access technology and the second radio access technology non-simultaneously. To be specific, a time period in which the terminal device sends an uplink signal to the network device by using the first radio access technology is different from a time period in which the terminal device sends an uplink signal to the network device by using the second radio access technology. For example, a time period is a slot, in a slot 1, the terminal device sends an uplink signal to the network device by using the first radio access technology; and in a slot 2, the terminal device sends an uplink signal to the network device by using the second radio access technology. However, in the slot 1, the terminal device sends the uplink signal to the network device without using the second radio access technology; and in the slot 2, the terminal device sends the uplink signal to the network device without using the first radio access technology.

Further, the terminal device may determine, based on an explicit or implicit indication of the network device, to send an uplink signal to the network device by using the first radio access technology and the second radio access technology in the TDM manner. For example, in a possible implementation, the terminal device receives first indication information from the network device, where the first indication information indicates the terminal device to send an uplink signal to the network device by using the first radio access technology and the second radio access technology in the TDM manner; and the terminal device determines, according to the indication of the first indication information, to use the TDM manner. In another possible implementation, the terminal device receives second indication information from the network device, where the second indication information includes a DL-reference UL/DL configuration, a reference time division duplex configuration, or a reference UL/DL configuration; and the terminal device may determine, based on an understanding of the second indication information, to use the TDM manner. In another possible implementation, if the terminal device determines that a sum of the first maximum transmission power and the second maximum transmission power is greater than a first threshold, the terminal device determines to use the TDM manner. In another possible implementation, the terminal device receives third indication information from the network device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology; and the terminal device may determine, based on the understanding of the second indication information, to use the TDM manner.

It should be noted that the several possible implementations described above are described only as an example, and the several possible implementations may be separately used, or may be used in combination with each other. In an example, the terminal device may receive the first indication information and also receive the third indication information from the network device; and determine, according to the first indication information, to use the TDM manner, and determine, according to the third indication information, a specific time period of transmitting a signal in the TDM manner. In another example, the terminal device may receive the second indication information and also receive the third indication information from the network device; and determine, according to the second indication information, to use the TDM manner, and determine, according to the third indication information, a specific time period of transmitting a signal in the TDM manner.

Further, it should be noted that, when the several possible implementations are used in combination with each other, for example, the terminal device receives the first indication information and the third indication information from the network device, the network device may send the first indication information and the third indication information respectively by using two messages, or may send the first indication information and the third indication information by using one message. The message includes both the first indication information and the third indication information.

In this application, the first radio access technology may be a 5G NR technology, and the second radio access technology may be an LTE technology; or the first radio access technology may be an LTE technology, and the second radio access technology may be a 5G NR technology. For ease of description, the following describes an example in which the first radio access technology may be the 5G NR technology, and the second radio access technology may be the LTE technology.

The following describes the information receiving method in this application based on the system architecture shown in FIG. 1 and with reference to specific embodiments (Embodiment 1 to Embodiment 4).

Embodiment 1

Figure 2A:
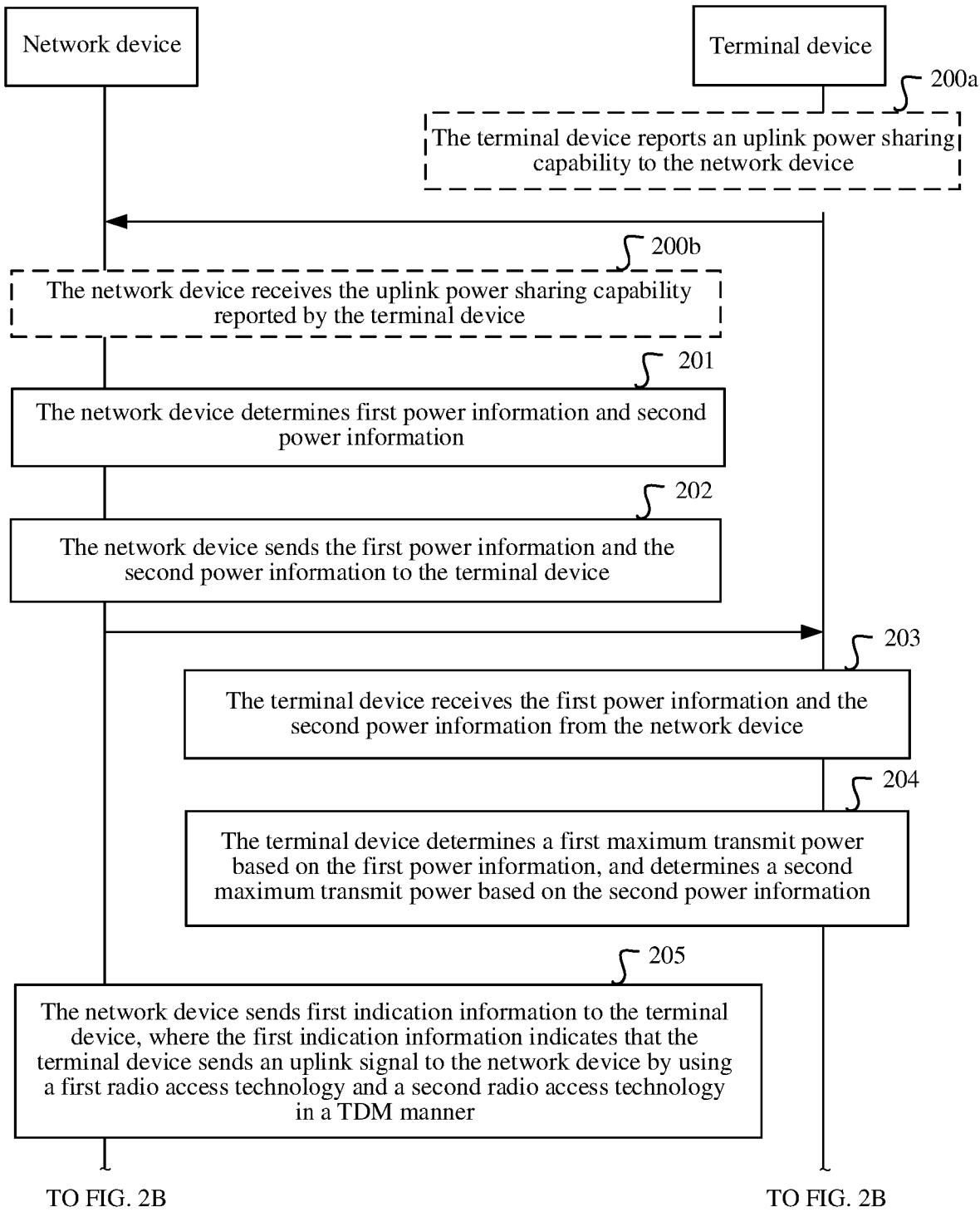
FIG. 2A and FIG. 2B are a corresponding schematic flowchart of an information receiving method according to Embodiment 1 of this application.
Figure 2B:
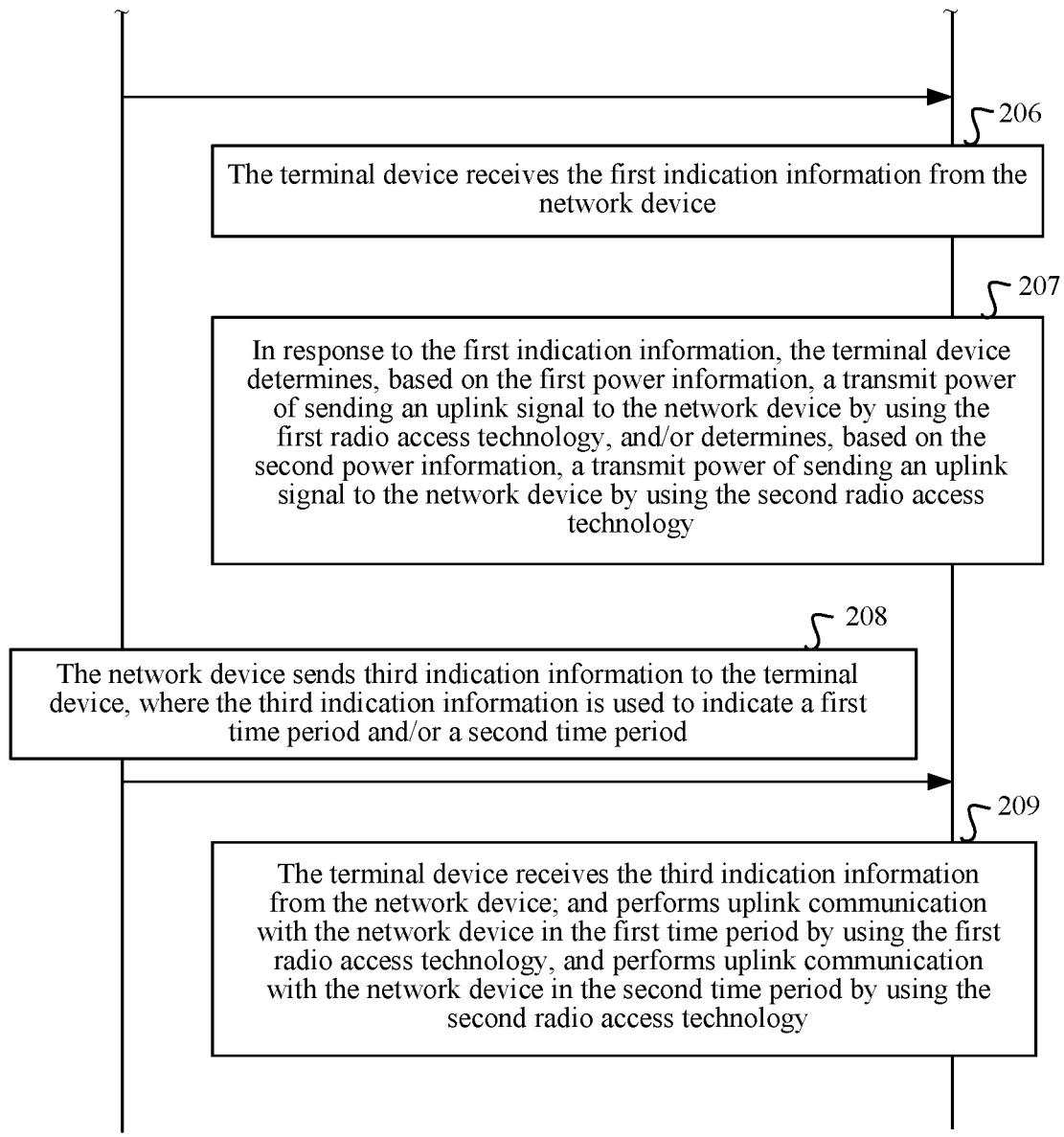

FIG. 2 is a corresponding schematic flowchart of an information receiving method according to this application. As shown in FIG. 2, the method includes the following.

Step 201: A network device determines first power information and second power information.

Herein, the first power information and the second power information are configured by the network device for a terminal device; in other words, the first power information and the second power information are terminal device-specific (UE specific) information.

Further, the first power information may correspond to a first radio access technology and be denoted by, for example, P-Max_NR, and is used to determine a maximum transmission power (a first maximum transmission power) to be used by the terminal device for transmitting a signal by the first radio access technology. The second power information may correspond to a second radio access technology and be denoted by, for example, P-Max_LTE, and is used to determine a maximum transmission power (a second maximum transmission power) to be used by the terminal device for transmitting a signal by the second radio access technology. The first maximum transmission power may be an upper limit of a maximum transmission power of an NR system, a calculated maximum transmission power that is used when the NR system actually transmits a signal, or a power PEMax,NR that is directly determined based on the configured P-Max_NR. The second maximum transmission power may be an upper limit of a maximum transmission power of an LTE system, a calculated maximum transmission power that is used when the LTE actually transmits a signal, or a power $P_{EMax,LTE}$ that is directly determined based on the configured P-Max_LTE.

The network device may set labels for the first power information and the second power information respectively, so that the terminal device distinguishes, based on the labels or in other distinguishing manners, between radio access technologies corresponding to the first power information and the second power information.

The first power information may be specifically a value whose specific range is not limited. Similarly, the second power information may also be a value whose specific range is not limited. The first reference power value and the second reference power value may be the same or may be different, and may be specifically configured by the network device based on an actual case. This is not limited in this application.

In a possible implementation, before the determining, by a network device, first power information and second power information, the method may further include: step 200a of reporting, by a terminal device, an uplink power sharing capability to the network device, and step 200b of receiving, by the network device, the uplink power sharing capability reported by the terminal device. In an example, it may be that when accessing the network device, the terminal device reports the uplink power sharing capability to the network device. The uplink power sharing capability includes supporting a sum of the first maximum transmission power and the second maximum transmission power greater than a first threshold, or not supporting a sum of the first maximum transmission power and the second maximum transmission power greater than the first threshold. The first threshold is obtained based on the maximum transmission power of the terminal device. For example, the first threshold may be the maximum transmission power of the terminal device, or may be less than the maximum transmission power of the terminal device.

In this application, when determining the first power information and the second power information, the network device may consider a plurality of types of factors. For example, one type of considered factor may be the uplink power sharing capability of the terminal device, or the considered factors may not include the uplink power sharing capability of the terminal device. This is not limited in this application.

Step 202: The network device sends the first power information and the second power information to a terminal device.

Herein, the network device may send the first power information and the second power information to the terminal device by using the second radio access technology (namely, an LTE technology). Specifically, the network device may send the first power information and the second power information to the terminal device by using a radio resource control (RRC) message or other messages, and details are not limited.

Step 203: The terminal device receives the first power information and the second power information from the network device.

Step 204: The terminal device determines a first maximum transmission power based on the first power information, and determines a second maximum transmission power based on the second power information, where the first maximum transmission power is a maximum transmission power to be used by the terminal device for transmitting a signal by a first radio access technology, and the second maximum transmission power is a maximum transmission power to be used by the terminal device for transmitting a signal by a second radio access technology.

Herein, there may be a plurality of manners in which the terminal device determines the first maximum transmission power based on the first power information. For example, the terminal device may determine the first maximum transmission power according to a rule agreed upon in advance.

In this application, the first maximum transmission power determined by the terminal device may be less than or equal to the maximum transmission power of the terminal device. Similarly, the second maximum transmission power determined by the terminal device may alternatively be less than or equal to the maximum transmission power of the terminal device.

Step 205: The network device sends first indication information to the terminal device, where the first indication information indicates that the terminal device sends an uplink signal to the network device by using the first radio access technology and the second radio access technology in a TDM manner.

Herein, the network device may send the first indication information by using terminal device-specific signaling, that is, the first indication information is terminal device-specific (UE Specific) information.

In an example, the first indication information may include one bit, and a correspondence between a state of the first indication information and content indicated by the first indication information may be shown in Table 1a or Table 1b.

TABLE 1a

Correspondence example 1

| State of first indication information | Content indicated by first indication information |
|---|---|
| 0 | In a TDM manner |
| 1 | Not in a TDM manner |

TABLE 1b

Correspondence example 2

| State of first indication information | Content indicated by first indication information |
|---|---|
| 1 | In a TDM manner |
| 0 | Not in a TDM manner |

As shown in Table 1a, when the state of the first indication information is "0", it indicates that the terminal device sends an uplink signal to the network device by using the first radio access technology and the second radio access technology in the TDM manner, and when the state of the first indication information is "1", it indicates that the terminal device sends an uplink signal to the network device not in the TDM manner. For example, the terminal device may send an uplink signal to the network device by using the first radio access technology and the second radio access technology in sharing mode. As shown in Table 1b, when the state of the first indication information is "1", it indicates that the terminal device sends an uplink signal to the network device by using the first radio access technology and the second radio access technology in the TDM manner, and when the state of the first indication information is "o", it indicates that the terminal device sends an uplink signal to the network device by using the first radio access technology and the second radio access technology not in the TDM manner.

It should be noted that, "o" and "1" described in Table 1a and Table 1b are only possible values and may be other values in other embodiments, and details are not limited.

In this application, "in the TDM manner" is only a description used as an example, and based on different content of the first indication information understood by the terminal device, may be expressed as: "in a manner in which a power is not shared" or "in a manner in which a transmission power of the terminal device when the first radio access technology is used and a transmission power of the terminal device when the second radio access technology is used do not affect each other", or may be other expressions, and details are not limited. For example, in other words, the first indication information indicates that the terminal device sends an uplink signal to the network device by using the first radio access technology and the second radio access technology in the manner in which a power is not shared; the first indication information indicates that the terminal device sends an uplink signal to the network device by using the first radio access technology and the second radio access technology in the manner in which a transmission power of the terminal device when the first radio access technology is used and a transmission power of the terminal device when the second radio access technology is used do not affect each other; or the first indication information indicates that the terminal device sends an uplink signal to the network device by using the first radio access technology and the second radio access technology in the manner in which sending is performed by using the first radio access technology and the second radio access technology non-simultaneously.

Further, based on the uplink power sharing capability reported by the terminal device, if the network device determines that the terminal device does not support the sum of the first maximum transmission power and the second maximum transmission power greater than the first threshold, the network device may send the first indication information to the terminal device. In this case, the terminal device does not have a power sharing capability, and consequently, a problem that the terminal device cannot normally transmit a signal because a sum of a transmission power when the first radio access technology is used and a transmission power when the second radio access technology is used exceeds the maximum transmission power of the terminal device may probably occur. Such a problem can be effectively resolved in the foregoing manner. If the network device determines that the terminal device supports the sum of the first maximum transmission power and the second maximum transmission power greater than the first threshold, in this case, the terminal device has the power sharing capability, that is, the terminal device can configure the first maximum transmission power and the second maximum transmission power to avoid that the sum of the two exceeds the maximum transmission power of the terminal device. Therefore, the network device may not send the first indication information to the terminal device. Further, if the terminal device configures the first maximum transmission power and the second maximum transmission power, the first maximum transmission power and the second maximum transmission power may be limited, further affecting coverage of LTE-NR DC. Considering this, in this application, in this case, the network device may also send the first indication information to the terminal device, thereby effectively improving the coverage of the LTE-NR DC.

Step 206: The terminal device receives the first indication information from the network device.

Herein, after receiving the first indication information, the terminal device may determine, according to the first indication information, to send an uplink signal to the network device in the TDM manner, in the manner in which a power is not shared, or in the manner in which a transmission power of the terminal device when the first radio access technology is used and a transmission power of the terminal device when the second radio access technology is used do not affect each other.

Further, the method may further include: Step 207: In response to the first indication information, the terminal device determines, based on the first power information, a transmission power (referred to as a transmission power 1 for ease of description) of sending an uplink signal to the network device by using the first radio access technology, and/or determines, based on the second power information, a transmission power (referred to as a transmission power 2) of sending an uplink signal to the network device by using the second radio access technology.

Herein, for a manner in which the terminal device determines, based on the first power information, the transmission power of sending an uplink signal to the network device by using the first radio access technology, refer to a method determined in an LTE system, or other possible implementations may be used. This is not specifically limited in this application.

In an example, when the terminal device determines the transmission power 1, information on which the determining is based includes the first power information but does not include the second power information, or in other words, the terminal device determines the transmission power 1 based on the first maximum transmission power but not based on the second maximum transmission power. When the terminal device determines the transmission power 2, information on which the determining is based includes the second power information but does not include the first power information, or in other words, the terminal device determines the transmission power 2 based on the second maximum transmission power but not based on the first maximum transmission power. It can be learned from the foregoing description that, when determining the transmission power 1, the terminal device does not need to consider the second power information, and when determining the transmission power 2, the terminal device does not need to consider the first power information. That is, the terminal device can independently determine the transmission power 1 and the transmission power 2, thereby avoiding a problem in the prior art that the transmission power 1 and/or the transmission power 2 may be limited because the transmission power 1 and the transmission power 2 both need to be considered during configuration performed by the terminal device.

Further, the method may further include: Step 208: The network device sends third indication information to the terminal device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

Herein, a unit of the first time period may be a subframe, a slot, a symbol, and the like, and details are not limited; and a unit of the second time period may be a subframe, a slot, a symbol, and the like, and details are not limited. Further, the unit of the first time period and the unit of the second time period may be consistent. For example, the unit of the first time period is a slot, and correspondingly, and the unit of the second time period is also a slot.

For example, the unit of the first time period and the unit of the second time period each are a slot. One frame includes ten slots: a slot 0, a slot 1, a slot 2, a slot 3, a slot 4, a slot 5, a slot 6, a slot 7, a slot 8, and a slot 9. In this case, the first time period indicated by the third indication information may be the slot 1, the slot 3, the slot 5, the slot 7, and the slot 9, and the second time period indicated by the third indication information may be the slot 0, the slot 2, the slot 4, the slot 6, and the slot 8.

In this application, the first time period and/or the second time period indicated by the third indication information may be understood as a TDM pattern, and may be specifically time periods (uplink slots) in which the terminal device transmits a signal by using the first radio access technology, and time periods (uplink slots) in which the terminal device transmits a signal by using the second radio access technology.

Step 209: The terminal device receives the third indication information from the network device.

In an example, in response to the third indication information, the terminal device may perform uplink communication with the network device in the first time period by using the first radio access technology, where a transmission power in the uplink communication is the transmission power 1 determined in step 207; or the terminal device may perform uplink communication with the network device in the second time period by using the second radio access technology, where a transmission power in the uplink communication is the transmission power 2 determined in step 207.

In another example, the terminal device may not perform step 207. In this case, in response to the third indication information, the terminal device may determine, based on the first power information, the transmission power (namely, the transmission power 1) of sending an uplink signal to the network device in the first time period by using the first radio access technology, and/or determine, based on the second power information, the transmission power (namely, the transmission power 2) of sending an uplink signal to the network device in the second time period by using the second radio access technology.

In this example, the transmission power 1 determined by the terminal device should be less than or equal to the first maximum transmission power, and if the first maximum transmission power is equal to the maximum transmission power of the terminal device, the transmission power 1 determined by the terminal device may be the maximum transmission power of the terminal device. The transmission power 2 determined by the terminal device should be less than or equal to the second maximum transmission power, and if the second maximum transmission power is equal to the maximum transmission power of the terminal device, the transmission power 2 determined by the terminal device may be the maximum transmission power of the terminal device.

Further, based on the transmission power 1 determined in this example, the terminal device may perform uplink communication with the network device in the first time period by using the first radio access technology, where the transmission power in the uplink communication is the transmission power 1; or based on the transmission power 2 determined in this example, the terminal device may perform uplink communication with the network device in the second time period by using the second radio access technology, where the transmission power in the uplink communication is the transmission power 2.

In another example, the terminal device may not perform step 207. In this case, in response to the third indication information, the terminal device may determine, based on the first power information, the transmission power (namely, the transmission power 1) of sending an uplink signal to the network device in the first time period by using the first radio access technology, and/or a transmission power (namely, a transmission power 3) of sending an uplink signal to the network device in the second time period by using the second radio access technology; or the terminal device may determine, based on the second power information, the transmission power (namely, the transmission power 2) of sending an uplink signal to the network device in the second time period by using the second radio access technology, and/or a transmission power (namely, a transmission power 4) of sending an uplink signal to the network device in the first time period by using the first radio access technology.

In this example, the transmission power 1 determined by the terminal device may be the maximum transmission power of the terminal device, and the transmission power 3 is zero. The transmission power 2 determined by the terminal device may be the maximum transmission power of the terminal device, and the transmission power 4 is zero.

Further, based on the transmission power 1 and the transmission power 3 determined in this example, the terminal device may perform uplink communication with the network device in the first time period by using the first radio access technology, where the transmission power in the uplink communication is the transmission power 1. Because the transmission power 3 is zero, the terminal device performs uplink communication with the network device in the first time period without using the second radio access technology. Alternatively, based on the transmission power 2 and the transmission power 4 determined in this example, the terminal device may perform uplink communication with the network device in the second time period by using the second radio access technology, where the transmission power in the uplink communication is the transmission power 2. Because the transmission power 4 is zero, the terminal device performs uplink communication with the network device in the second time period without using the second radio access technology.

It can be learned from the foregoing procedure that, the network device indicates, by using the first indication information, that the terminal device sends an uplink signal to the network device by using the first radio access technology and the second radio access technology in the TDM manner/ in the manner in which a power is not shared/in the manner a transmission power of the terminal device when the first radio access technology is used and a transmission power of the terminal device when the second radio access technology is used do not affect each other; and notifies, by using the third indication information, the terminal device of time periods (uplink slots) in which a signal is transmitted by using the first radio access technology, and time periods (uplink slots) in which a signal is transmitted by using the second radio access technology, so that the transmission power at which the network device and the terminal device transmit a signal to each other by using the first radio access technology in the TDM manner does not affect the transmission power at which the network device and the terminal device transmit a signal to each other by using the second radio access technology in the TDM manner.

It should be noted that: (1) the foregoing step numbers are only a description of an execution procedure as an example, and execution orders of the steps in this application are not specifically limited. For example, step 205 and step 208 may be simultaneously performed, or step 208 may be performed before step 205. (2) During specific implementation, some steps described in the foregoing procedure are not necessary steps. For example, in other examples, step 207 may not be included, and specifically, the steps described above may be appropriately deleted based on an actual case or an actual need; or some steps may be performed by using other alternative solutions. For example, in step 208, the network device sends the third indication information to the terminal device or may use another indication manner to indicate the first time period and/or the second time period. This is not limited in this application.

Embodiment 2

Figure 3:
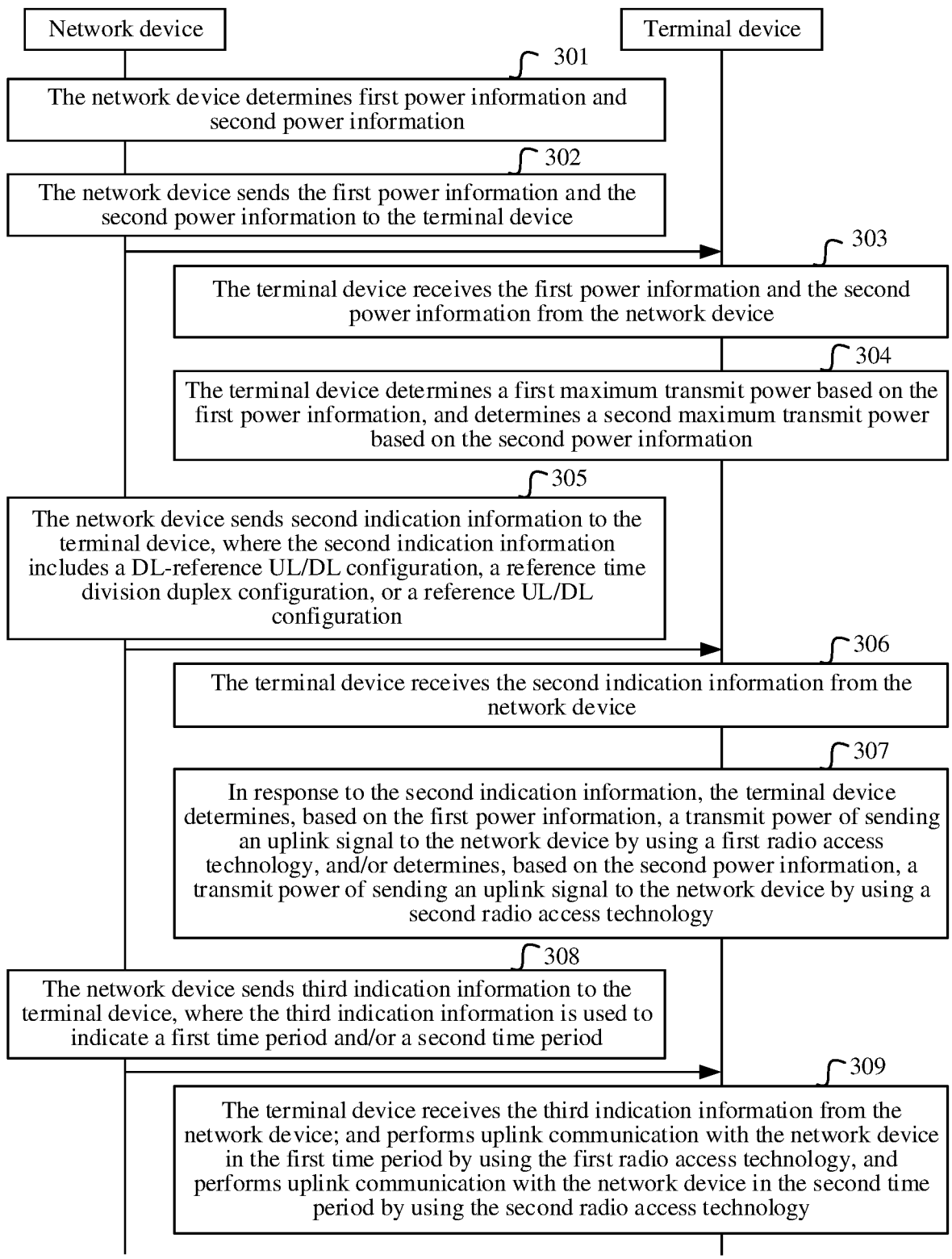
FIG. 3 is a corresponding schematic flowchart of an information receiving method according to Embodiment 2 of this application.

FIG. 3 is a corresponding schematic flowchart of an information receiving method according to this application. As shown in FIG. 3, the method includes the following.

Step 301: A network device determines first power information and second power information.

Step 302: The network device sends the first power information and the second power information to a terminal device.

Step 303: The terminal device receives the first power information and the second power information from the network device.

Step 304: The terminal device determines a first maximum transmission power based on the first power information, and determines a second maximum transmission power based on the second power information.

For specific descriptions of step 301 to step 304, refer to Embodiment 1.

Step 305: The network device sends second indication information to the terminal device, where the second indication information includes a DL-reference UL/DL configuration, a reference time division duplex configuration, or a reference UL/DL configuration.

Herein, the DL-reference UL/DL configuration, the reference time division duplex configuration, or the reference UL/DL configuration may be specifically a hybrid automatic repeat request (HARQ) feedback slot configuration on an LTE side in an LTE NR DC mode.

The second indication information is terminal device-specific (UE Specific) information.

Further, based on an uplink power sharing capability reported by the terminal device, if the network device determines that the terminal device does not support a sum of the first maximum transmission power and the second maximum transmission power greater than a first threshold, the network device may send the second indication information to the terminal device. In this case, the terminal device does not have a power sharing capability, and consequently, a problem that the terminal device cannot normally transmit a signal because a sum of a transmission power when a first radio access technology is used and a transmission power when a second radio access technology is used exceeds a maximum transmission power of the terminal device may probably occur. Such a problem can be effectively resolved in the foregoing manner. If the network device determines that the terminal device supports the sum of the first maximum transmission power and the second maximum transmission power greater than the first threshold, in this case, the terminal device has the power sharing capability, that is, the terminal device can configure the first maximum transmission power and the second maximum transmission power to avoid that the sum of the two exceeds the maximum transmission power of the terminal device. Therefore, the network device may not send the second indication information to the terminal device. Further, if the terminal device configures the first maximum transmission power and the second maximum transmission power, the first maximum transmission power and the second maximum transmission power may be limited, further affecting coverage of LTE-NR DC. Considering this, in this application, in this case, the network device may also send the second indication information to the terminal device, thereby effectively improving the coverage of the LTE-NR DC.

Step 306: The terminal device receives the second indication information from the network device.

In a possible implementation, that the terminal device receives the second indication information may be understood as sending an uplink signal to the network device in a TDM manner. In this case, in an example, an understanding of the second indication information by the network device side and the terminal device side may be agreed upon in advance in a protocol. Specifically, from a perspective of the network device, if the network device sends the second indication information to the terminal device, it may be understood that the network device indicates the terminal device to send an uplink signal to the network device in the TDM manner; and from a perspective of the terminal device, if the terminal device receives the second indication information, it may be understood that the terminal device needs to send an uplink signal to the network device subsequently in the TDM manner.

In another possible implementation, receiving of the second indication information by the terminal device can directly trigger step 307, or the second indication information triggers the terminal device to perform step 307.

Step 307: The terminal device determines, based on the first power information, a transmission power of sending an uplink signal to the network device by using the first radio access technology; and/or determines, based on the second power information, a transmission power of sending an uplink signal to the network device by using the second radio access technology. For a specific description of this step, refer to Embodiment 1.

Further, the method may further include: Step 308: The network device sends third indication information to the terminal device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

Step 309: The terminal device receives the third indication information from the network device, and responds to the third indication information.

It should be noted that, a difference between Embodiment 2 and Embodiment flies in that: In Embodiment 2, the network device sends the second indication information to the terminal device, where the second indication information includes the DL-reference UL/DL configuration, the reference time division duplex configuration, or the reference UL/DL configuration, and in Embodiment 1, the network device sends the first indication information to the terminal device, where the first indication information indicates that the terminal device sends an uplink signal to the network device by using the first radio access technology and the second radio access technology in the TDM manner. In comparison, a more direct manner is used in Embodiment 1 to indicate the terminal device to use the TDM manner. This is a typical explicit manner. However, in Embodiment 2, the DL-reference UL/DL configuration, the reference time division duplex configuration, or the reference UL/DL configuration that is sent by the network device to the terminal device implicitly indicates the terminal device to use the TDM manner. In such a solution, the network device does not need to additionally send a piece of dedicated signaling to the terminal device, so that transmission resources can be effectively saved. In this application, step 305 and step 306 in Embodiment 2 can also be understood as an alternative solution of step 205 and step 206 in Embodiment 1.

Embodiment 3

Figure 4:
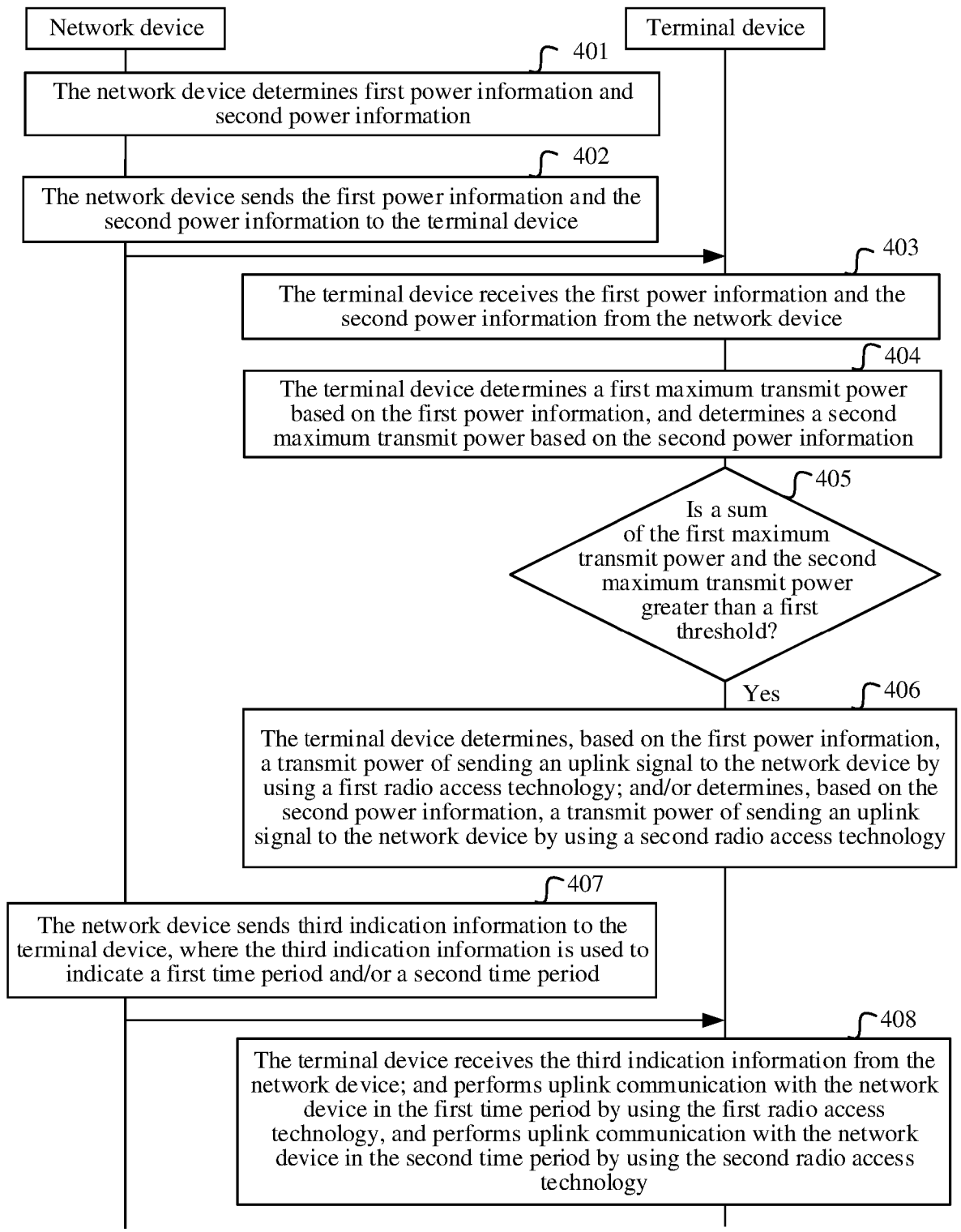
FIG. 4 is a corresponding schematic flowchart of an information receiving method according to Embodiment 3 of this application.

FIG. 4 is a corresponding schematic flowchart of an information receiving method according to this application. As shown in FIG. 4, the method includes the following.

Step 401: A network device determines first power information and second power information.

Step 402: The network device sends the first power information and the second power information to a terminal device.

Step 403: The terminal device receives the first power information and the second power information from the network device.

Step 404: The terminal device determines a first maximum transmission power based on the first power information, and determines a second maximum transmission power based on the second power information.

For specific descriptions of step 401 to step 404, refer to Embodiment 1.

Step 405: The terminal device determines whether a sum of the first maximum transmission power and the second maximum transmission power is greater than a first threshold, and if the sum of the first maximum transmission power and the second maximum transmission power is greater than the first threshold, performs step 406, or otherwise, sends a signal to the network device not in a TDM manner. A specific manner is not limited.

The first threshold may be obtained based on a maximum transmission power of the terminal device. For example, the first threshold may be the maximum transmission power of the terminal device, or may be less than the maximum transmission power of the terminal device.

If the sum of the first maximum transmission power and the second maximum transmission power is greater than the first threshold, in this case, the terminal device cannot transmit a signal by using the first radio access technology and the second radio access technology simultaneously. Therefore, when the sum of the first maximum transmission power and the second maximum transmission power is greater than the first threshold, in an example, it may be understood that the terminal device needs to send an uplink signal to the network device in the TDM manner, and in another example, the terminal device may alternatively directly trigger step 406.

Step 406: Determine, based on the first power information, a transmission power of sending an uplink signal to the network device by using the first radio access technology; and/or determine, based on the second power information, a transmission power of sending an uplink signal to the network device by using the second radio access technology.

Further, the method may further include: Step 407: The network device sends third indication information to the terminal device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

Step 408: The terminal device receives the third indication information from the network device, and responds to the third indication information.

It should be noted that, a difference between Embodiment 3 and Embodiment 1 in that: In Embodiment 3, the terminal device can determine whether to send an uplink signal to the network device by using the first radio access technology and the second radio access technology in the TDM manner by determining whether the sum of the first maximum transmission power and the second maximum transmission power is greater than the first threshold. Compared with Embodiment 1, Embodiment 3 is a typical implicit manner, in which transmission resources can be more effectively saved.

Embodiment 4

Figure 5:
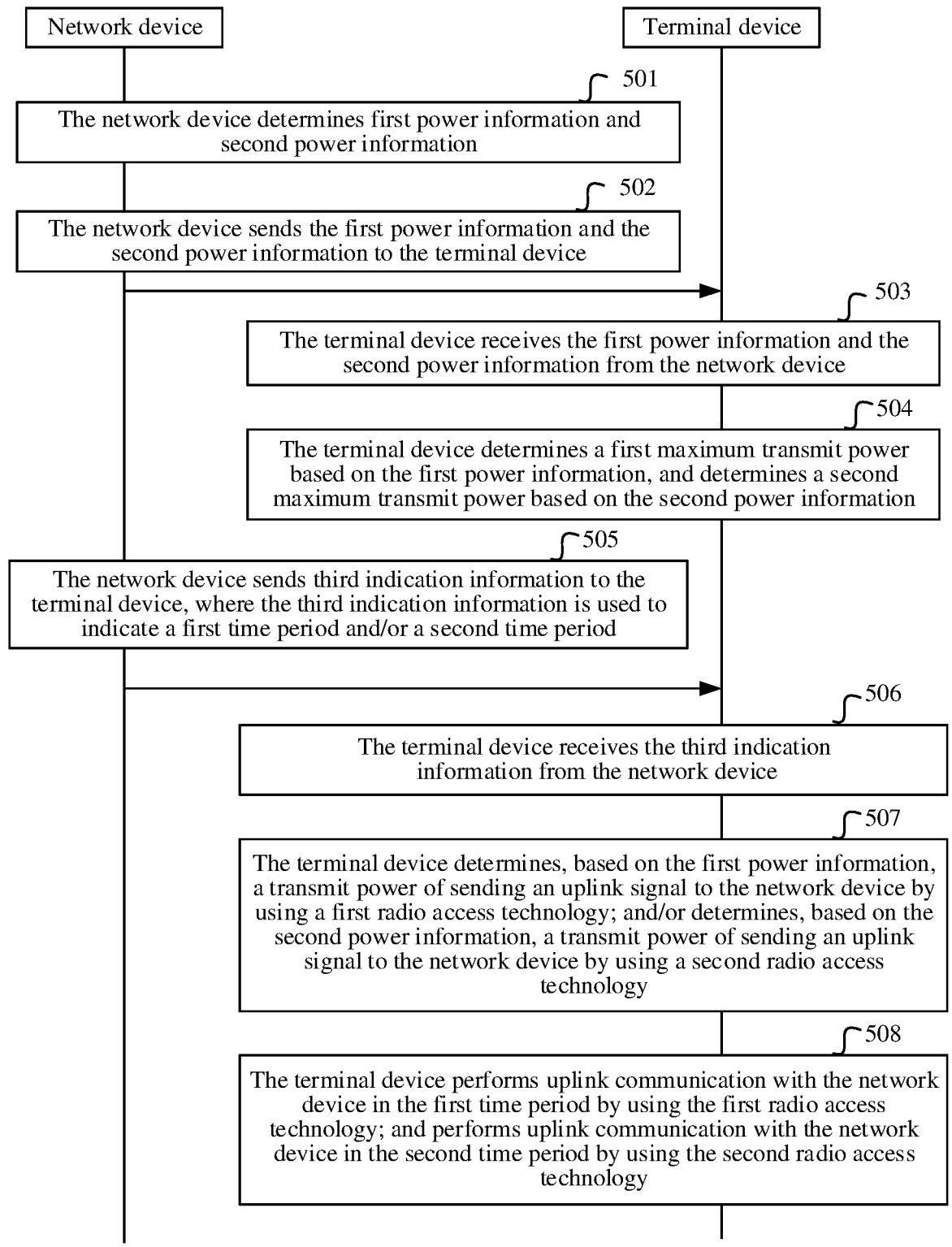
FIG. 5 is a corresponding schematic flowchart of an information receiving method according to Embodiment 4 of this application.

FIG. 5 is a corresponding schematic flowchart of an information receiving method according to this application. As shown in FIG. 5, the method includes the following.

Step 501: A network device determines first power information and second power information.

Step 502: The network device sends the first power information and the second power information to a terminal device.

Step 503: The terminal device receives the first power information and the second power information from the network device.

Step 504: The terminal device determines a first maximum transmission power based on the first power information, and determines a second maximum transmission power based on the second power information.

For specific descriptions of step 501 to step 504, refer to Embodiment 1.

Step 505: The network device sends third indication information to the terminal device, where the third indication information indicates a first time period and/or a second time period; and the first time period includes a time period in which the terminal device performs uplink communication with the network device by using a first radio access technology, and the second time period includes a time period in which the terminal device performs uplink communication with the network device by using a second radio access technology.

Herein, the network device may send the third indication information by using terminal device-specific signaling, that is, the third indication information is terminal device-specific (user specific) information.

Step 506: The terminal device receives the third indication information from the network device.

In a possible implementation, that the terminal device receives the third indication information may be understood as sending an uplink signal to the network device in a TDM manner. In this case, an understanding of the third indication information by the network device side and the terminal device side may be agreed upon in advance in a protocol. Specifically, from a perspective of the network device, if the network device sends the third indication information to the terminal device, it may be understood that the network device indicates the terminal device to send an uplink signal to the network device in the TDM manner; and from a perspective of the terminal device, if the terminal device receives the third indication information, it may be understood that the terminal device needs to send an uplink signal to the network device subsequently in the TDM manner.

Step 507: In response to the third indication information, the terminal device may determine, based on the first power information, a transmission power of sending the uplink signal to the network device in the first time period by using the first radio access technology, and/or determine, based on the second power information, a transmission power of sending the uplink signal to the network device in the second time period by using the second radio access technology.

Step 508: The terminal device performs uplink communication with the network device in the first time period by using the first radio access technology; and performs uplink communication with the network device in the second time period by using the second radio access technology.

In an example, in response to the third indication information, the terminal device can determine, based on the first power information, a transmission power (namely, a transmission power 1) of sending an uplink signal to the network device in the first time period by using the first radio access technology; and/or determine, based on the second power information, a transmission power (namely, a transmission power 2) of sending an uplink signal to the network device in the second time period by using the second radio access technology.

In this example, the transmission power 1 determined by the terminal device should be less than or equal to the first maximum transmission power. If the first maximum transmission power is equal to the maximum transmission power of the terminal device, the transmission power 1 determined by the terminal device may be the maximum transmission power of the terminal device. The transmission power 2 determined by the terminal device should be less than or equal to the second maximum transmission power. If the second maximum transmission power is equal to the maximum transmission power of the terminal device, the transmission power 2 determined by the terminal device may be the maximum transmission power of the terminal device.

Further, based on the transmission power 1 determined in this example, the terminal device may perform uplink communication with the network device in the first time period by using the first radio access technology, where the transmission power in uplink communication is the transmission power 1; or based on the transmission power 2 determined in this example, the terminal device may perform uplink communication with the network device in the second time period by using the second radio access technology, where the transmission power in the uplink communication is the transmission power 2.

In another example, in response to the third indication information, the terminal device may determine, based on the first power information, the transmission power (namely, the transmission power 1) of sending the uplink signal to the network device in the first time period by using the first radio access technology and a transmission power (namely, a transmission power 3) of sending the uplink signal to the network device in the second time period by using the second radio access technology; or the terminal device may determine, based on the second power information, the transmission power (namely, the transmission power 2) of sending an uplink signal to the network device in the second time period by using the second radio access technology and a transmission power (namely, a transmission power 4) of sending an uplink signal to the network device in the first time period by using the first radio access technology.

In this example, the transmission power 1 determined by the terminal device may be the maximum transmission power of the terminal device, and the transmission power 3 is zero. The transmission power 2 determined by the terminal device may be the maximum transmission power of the terminal device, and the transmission power 4 is zero.

Further, based on the transmission power 1 and the transmission power 3 determined in this example, the terminal device may perform uplink communication with the network device in the first time period by using the first radio access technology, where the transmission power in uplink communication is the transmission power 1. Because the transmission power 3 is zero, the terminal device performs uplink communication with the network device in the first time period without using the second radio access technology. Alternatively, based on the transmission power 2 and the transmission power 4 determined in this example, the terminal device may perform uplink communication with the network device in the second time period by using the second radio access technology, where the transmission power in uplink communication is the transmission power 2. Because the transmission power 4 is zero, the terminal device performs uplink communication with the network device in the second time period without using the second radio access technology.

It should be noted that a difference between Embodiment 4 and Embodiment 1 in that: In Embodiment 4, the network device indicates, without sending the first indication information to the terminal device, the terminal device to send an uplink signal to the network device in the TDM manner, in the manner in which a power is not shared, or in a manner in which a transmission power of the terminal device when the first radio access technology is used and a transmission power of the terminal device when the second radio access technology is used do not affect each other. Instead, the network device sends the third indication information to the terminal device to implicitly indicate the terminal device to send an uplink signal to the network device in the TDM manner, in the manner in which a power is not shared, or in a manner in which or a transmission power of the terminal device when the first radio access technology is used and a transmission power of the terminal device when the second radio access technology is used do not affect each other.

For Embodiment 1 to Embodiment 4, a difference between different embodiments lies in how the terminal device determines to send an uplink signal to the network device in the TDM manner. In Embodiment 1, the terminal device determines, according to the indication of the first indication information, to send an uplink signal to the network device in the TDM manner; in Embodiment 2, the terminal device determines, based on the understanding of the second indication information, to send an uplink signal to the network device in the TDM manner; in Embodiment 3, the terminal device determines, based on that the sum of the first maximum transmission power and the second maximum transmission power is greater than the first threshold, to send an uplink signal to the network device in the TDM manner; and in Embodiment 4, the terminal device determines, based on an understanding of the third indication information, to send an uplink signal to the network device in the TDM manner. For other content except these differences, different embodiments may be cross-referenced.

In this application, because in Embodiment 1, Embodiment 2, and Embodiment 4, the terminal device determines, according to the indication information (which may be the first indication information, the second indication information, or the third indication information) sent by the network device, to send an uplink signal to the network device in the TDM manner. Therefore, the manner in Embodiment 1, Embodiment 2, and Embodiment 4 can be understood as an explicit manner; and in Embodiment 3, the terminal device determines to send an uplink signal to the network device in the TDM manner. Therefore, Embodiment 4 may be understood as an implicit manner.

For the explicit manner: based on the uplink power sharing capability reported by the terminal device, if the network device determines that the terminal device does not support the sum of the first maximum transmission power and the second maximum transmission power greater than the first threshold, the network device may send the indication information (which may be the first indication information, the second indication information, or the third indication information) to the terminal device. In this case, the terminal device does not have a power sharing capability, and consequently, a problem that the terminal device cannot normally transmit a signal because a sum of a transmission power when the first radio access technology is used and a transmission power when the second radio access technology is used exceeds the maximum transmission power of the terminal device may probably occur. Therefore, such a problem can be effectively resolved by indicating, by the network device in the explicit manner, the terminal device to send an uplink signal to the network device in the TDM manner. If the network device does not receive the uplink power sharing capability reported by the terminal device, the network device can indicate, also in the explicit manner, the terminal device to send an uplink signal to the network device in the TDM manner. If the network device determines that the terminal device supports the sum of the first maximum transmission power and the second maximum transmission power greater than the first threshold, in this case, the terminal device has the power sharing capability, that is, the terminal device can configure the first maximum transmission power and the second maximum transmission power to avoid that the sum of the two exceeds the maximum transmission power of the terminal device. Therefore, the network device may not send the indication information to the terminal device. Further, if the terminal device configures the first maximum transmission power and the second maximum transmission power, the first maximum transmission power and the second maximum transmission power may be limited, further affecting coverage of LTE-NR DC. Considering this, in this application, in this case, the network device may also send the indication information to the terminal device, thereby effectively improving the coverage of the LTE-NR DC.

For the implicit manner: in an example, the network device and the terminal device may agree in advance (or may agree upon a protocol in advance) that, if the terminal device supports the sum of the first maximum transmission power and the second maximum transmission power greater than the first threshold, after determining that the sum of the first maximum transmission power and the second maximum transmission power is greater than the first threshold, the terminal device can send, by directly using a power sharing manner and not using a TDM pattern, an uplink signal to the network device for processing. If the terminal device does not support the sum of the first maximum transmission power and the second maximum transmission power greater than the first threshold, after determining that the sum of the first maximum transmission power and the second maximum transmission power is greater than the first threshold, the terminal device can send an uplink signal to the network device by using the TDM pattern.

In another example, the network device and the terminal device may agree in advance (or may agree upon a protocol in advance) that, regardless of whether the terminal device supports the sum of the first maximum transmission power and the second maximum transmission power greater than the first threshold, after determining that the sum of the first maximum transmission power and the second maximum transmission power is greater than the first threshold, the terminal device sends an uplink signal to the network device by using the TDM pattern.

Certainly, the explicit manner and the implicit manner herein are simply distinguished based only on whether the network device needs to send the indication information. This is not specifically limited in this application.

With an increase of mobile users and emergence of large-capacity services (such as a high-definition video service), an important design for evolution of mobile communications toward 5G NR communications systems is introduction of a high bandwidth. A higher bandwidth indicates more bandwidth resources used for data transmission and a larger supported service volume. Therefore, compared with a carrier bandwidth of an LTE communications system, a carrier bandwidth in NR may increase. However, considering costs and the service volume of the terminal device, the bandwidth supported by the terminal device in the NR communications system may be less than the carrier bandwidth. The bandwidth supported by the terminal device can be referred to as a radio frequency bandwidth of the terminal device or a channel bandwidth of the terminal device.

A standard conference on a 3rd generation partnership project (3rd generation partnership project, 3GPP) introduces, in discussion, a bandwidth part (bandwidth part, BWP), which may also be referred to as a carrier bandwidth part (carrier bandwidth part). The BWP includes some consecutive resource units in frequency domain, such as a resource block (resource block, RB).

Figure 6A:
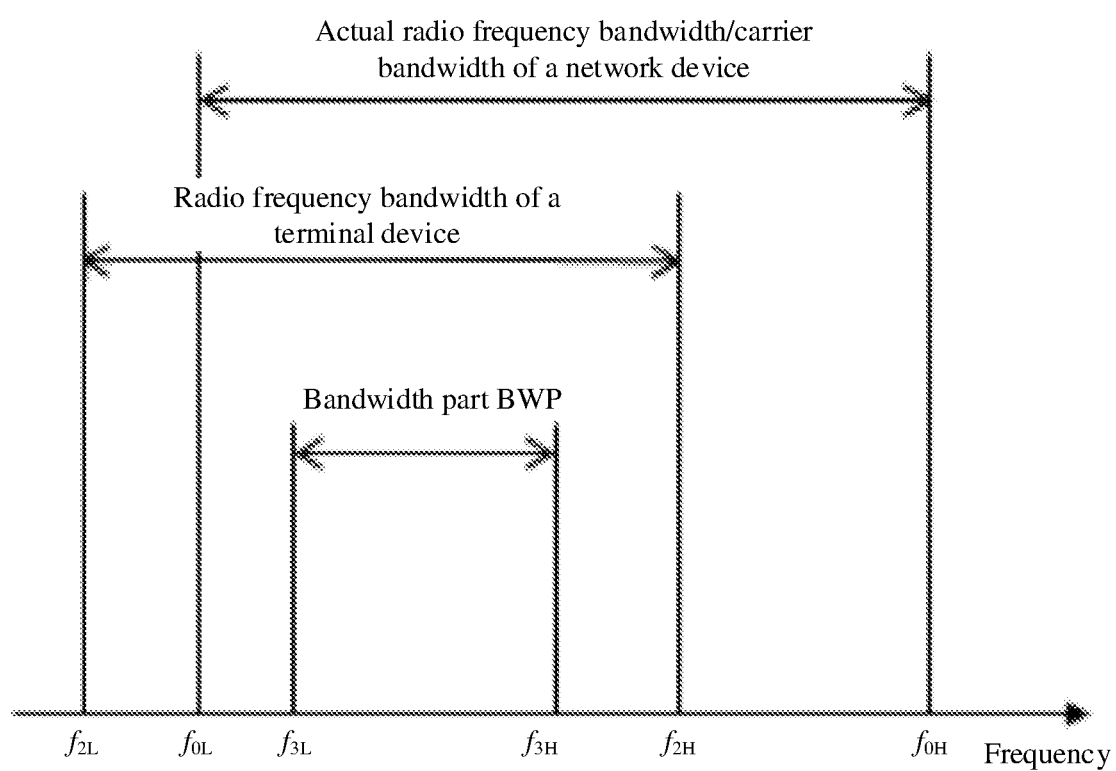
FIG. 6*a* is a schematic diagram of a possible radio frequency bandwidth selected by a terminal device.

However, after the BWP is introduced and when the carrier bandwidth increases, because the terminal device cannot accurately or appropriately determine a carrier bandwidth of the terminal device and a location thereof, the radio frequency bandwidth selected by the terminal device may be greater than the radio frequency bandwidth or the carrier bandwidth of the network device, and consequently, adjacent frequency signals may be received, causing unnecessary interference. As shown in FIG. 6a, the radio frequency bandwidth or the carrier bandwidth of the network device ranges from $f_{0L}$ to $f_{0H}$. The BWP allocated to the terminal device ranges from $f_{3L}$ to $f_{3H}$, and the radio frequency bandwidth selected by the terminal device ranges from $f_{2L}$ to $f_{2H}$ (including the BWP), and in this case, signals between $f_{2L}$ to $f_{0L}$ may be received, causing interference.

Based on this, this application provides an information indication method, to resolve a technical problem that the terminal device cannot accurately or appropriately determine the carrier bandwidth of the terminal device and the location thereof. Description is made below with reference to specific embodiments (Embodiment 5 and Embodiment 6).

Embodiment 5

Figure 6B:
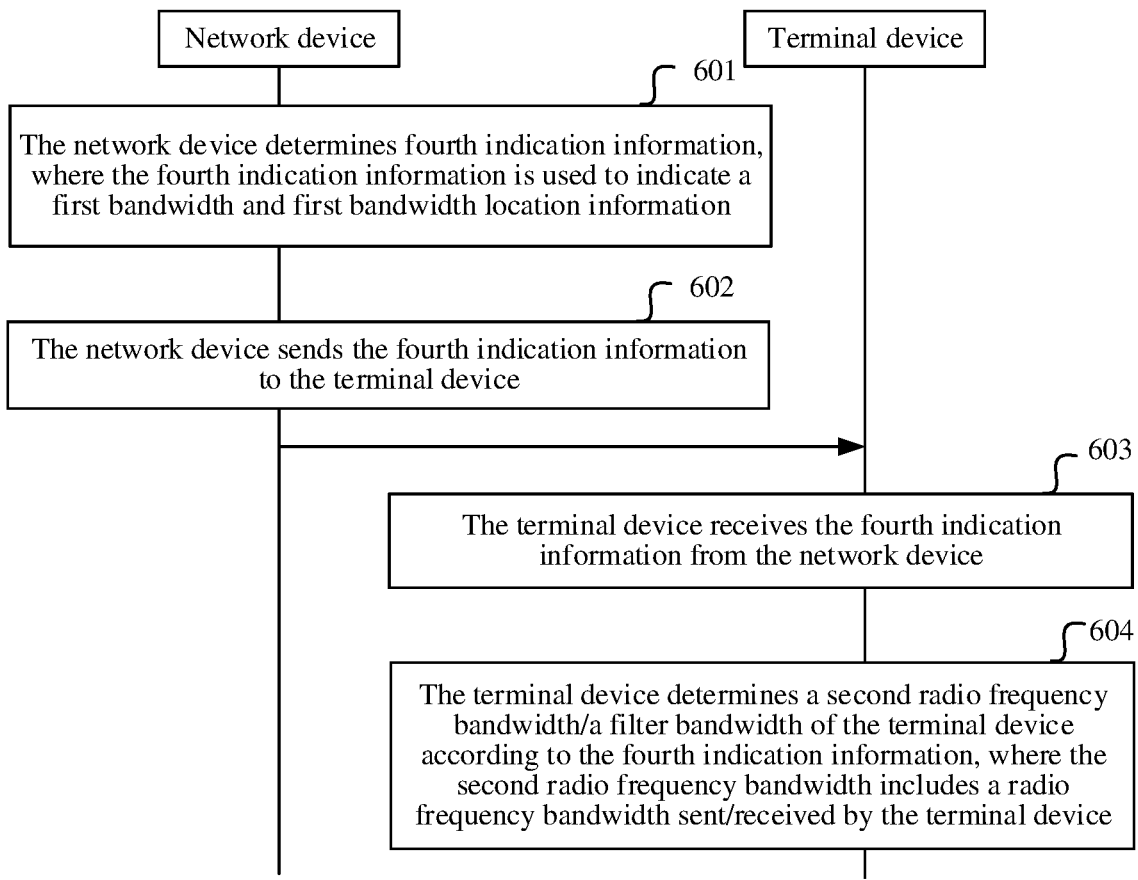
FIG. 6*b* is a corresponding schematic flowchart of an information indication method according to Embodiment 5 of this application.

FIG. 6b is a corresponding schematic flowchart of an information indication method according to this application. As shown in FIG. 6b, the method includes:

Step 601: A network device determines fourth indication information, where the fourth indication information indicates a first bandwidth and first bandwidth location information.

Step 602: The network device sends the fourth indication information to a terminal device.

Herein, when the fourth indication information indicates the first bandwidth, the first bandwidth may include one of a bandwidth value, a quantity of subcarriers, and a quantity of PRBs.

The first bandwidth may include a first radio frequency bandwidth or a first virtual bandwidth of the network device. The first radio frequency bandwidth is an actual radio frequency bandwidth of downlink sending information of the network device; and the first virtual bandwidth may be a part of the actual radio frequency bandwidth of the downlink sending information of the network device, and includes a BWP that is allocated to the terminal device by the network device. In other words, the first bandwidth indicated by the network device by using the fourth indication information may be the actual radio frequency bandwidth of the downlink sending information of the network device, or may be a part of the actual radio frequency bandwidth of the downlink sending information of the network device. In an example, referring to FIG. 6c, a start frequency of the first bandwidth (namely, a notified radio frequency bandwidth/virtual bandwidth of the network device) is $f_{1L}$, and an end frequency is $f_{1H}$. The start frequency of the first bandwidth is greater than a start frequency of the actual radio frequency bandwidth of the downlink sending information of the network device (namely, the actual radio frequency bandwidth/carrier bandwidth of the network device), that is, $f_{0L} < f_{1L}$; and an end frequency of the first bandwidth is less than an end frequency of the actual radio frequency bandwidth of the downlink sending information of the network device, that is, $f_{1H} \leq f_{0H}$.

When the fourth indication information indicates the first bandwidth location information, the first bandwidth location information may include at least one of a center frequency, a central PRB location, a central subcarrier location, a central absolute radio frequency channel number (ARFCN), a lowest frequency, a lowest PRB location, a lowest subcarrier location, a lowest absolute radio frequency channel number, a highest frequency, a highest PRB location, a highest subcarrier location, and a highest absolute radio frequency channel number of the first bandwidth.

The center frequency of the first bandwidth may refer to a center frequency value of the first bandwidth. The central PRB location may refer to a PRB number at a middle location of the first bandwidth, and if the middle location is between two PRBs, a larger PRB number may be selected. The central subcarrier location may refer to a subcarrier number at the middle location of the first bandwidth. The central absolute radio frequency channel number may be an absolute radio frequency channel number at the middle location of the first bandwidth. The lowest frequency may refer to a lowest frequency value of the first bandwidth. The lowest PRB location may refer to a minimum PRB number in the first bandwidth. The lowest subcarrier location may refer to a minimum subcarrier number in the first bandwidth. The lowest absolute radio frequency channel number may be a minimum absolute radio frequency channel number in the first bandwidth. The highest frequency may refer to a highest frequency value of the first bandwidth. The highest PRB location may refer to a maximum PRB number in the first bandwidth. The highest subcarrier location may refer to a maximum subcarrier number in the first bandwidth. The highest absolute radio frequency channel number may be a maximum absolute radio frequency channel number in the first bandwidth.

Herein, the fourth indication information may be sent by using an RRC message or other messages, and details are not limited.

Step 603: The terminal device receives the fourth indication information from the network device.

Step 604: The terminal device determines a second radio frequency bandwidth/a filter bandwidth of the terminal device according to the fourth indication information, where the second radio frequency bandwidth includes a radio frequency bandwidth sent/received by the terminal device.

Figure 6C:
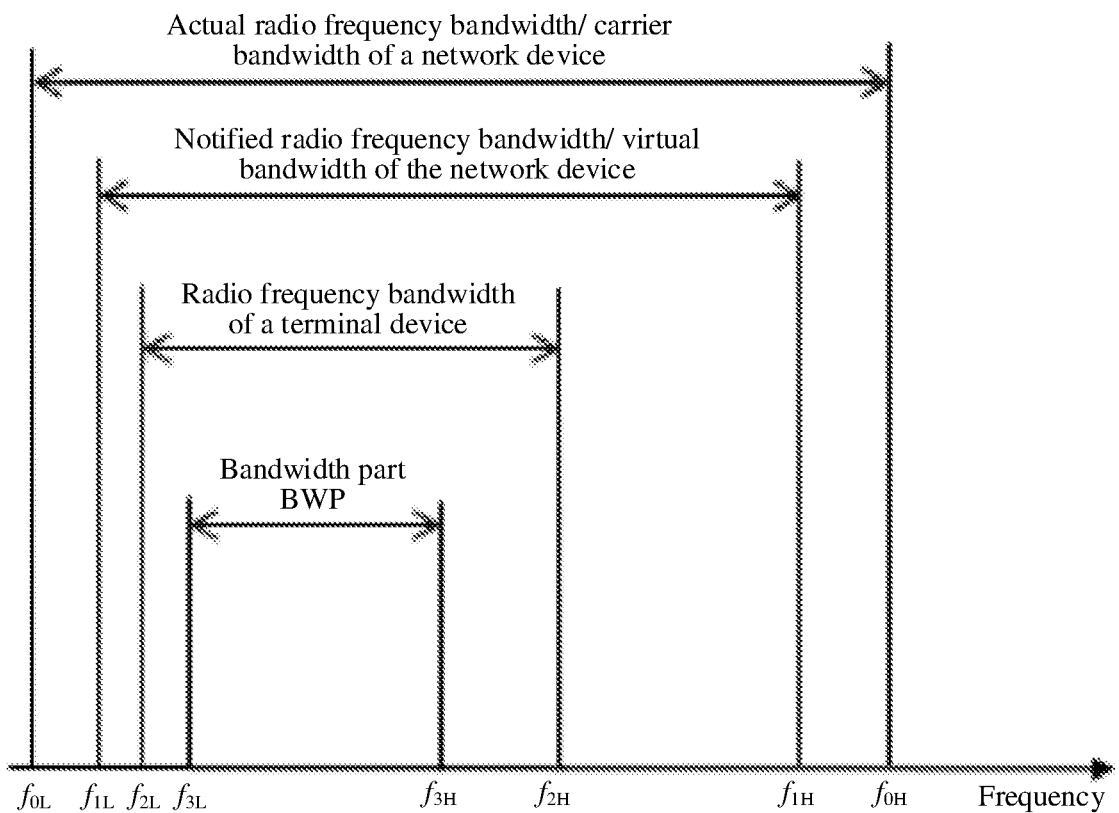
FIG. 6*c* is a schematic diagram of a radio frequency bandwidth selected by a terminal device according to an embodiment of this application.

In an example, the terminal device may determine, according to the fourth indication information, a start frequency and an end frequency of the first bandwidth, and further determine that a start frequency of the second radio frequency bandwidth is greater than or equal to the start frequency of the first bandwidth, and an end frequency of the second radio frequency bandwidth is less than or equal to the end frequency of the first bandwidth. Referring to FIG. 6c, a radio frequency bandwidth ($f_{2L}$ to $f_{2H}$) selected by the terminal device falls within a range of the radio frequency bandwidth or the carrier bandwidth ($f_{0L}$ to $f_{0H}$) of the network device, so that unnecessary interference caused by receiving an adjacent frequency signal can be effectively avoided.

Embodiment 6

Figure 7:
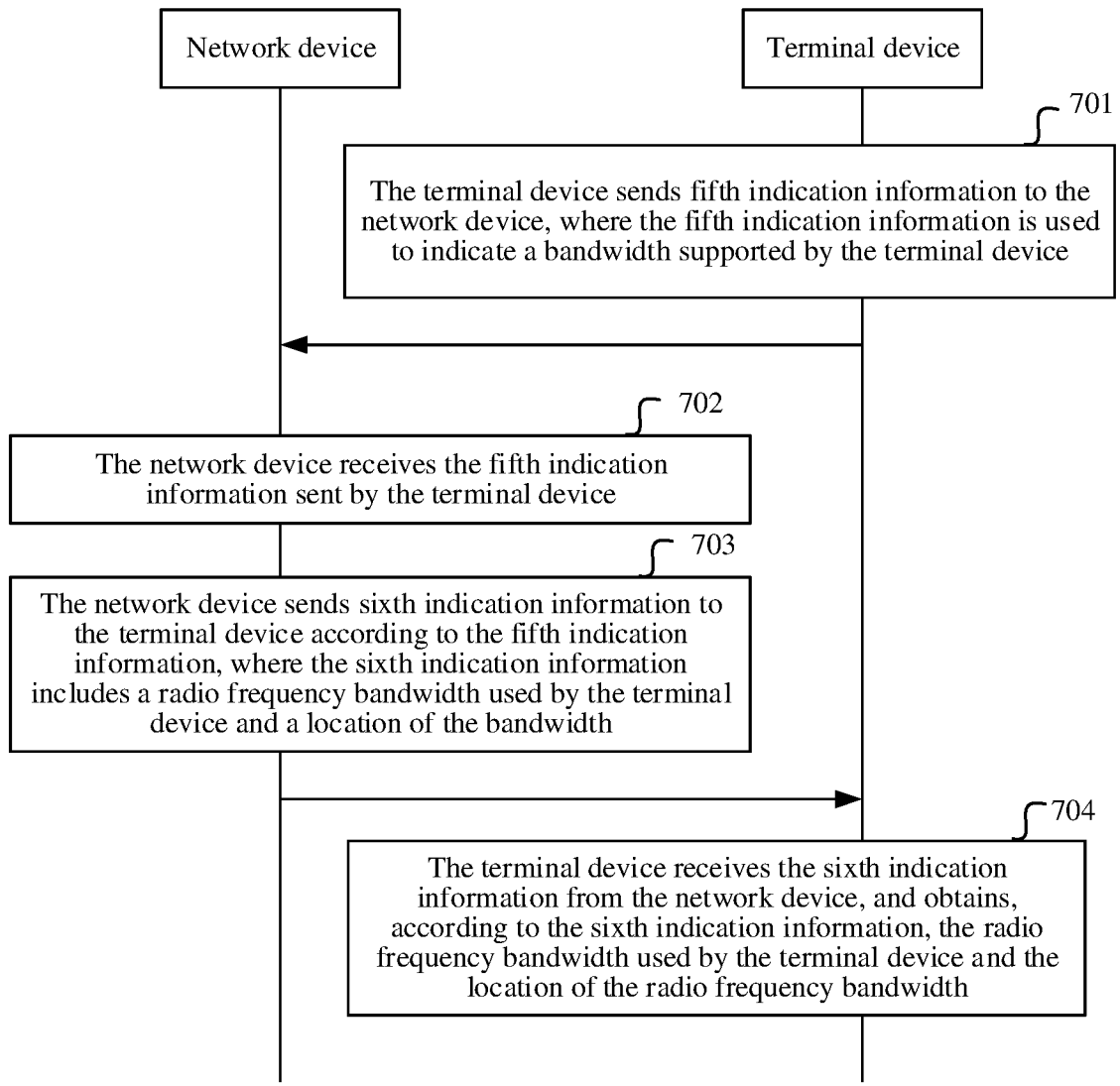
FIG. 7 is a corresponding schematic flowchart of an information indication method according to Embodiment 6 of this application.

FIG. 7 is a corresponding schematic flowchart of an information indication method according to this application. As shown in FIG. 7, the method includes the following.

Step 701: A terminal device sends fifth indication information to a network device.

Herein, the fifth indication information indicates a bandwidth supported by the terminal device, where the bandwidth supported by the terminal device includes a radio frequency bandwidth sent/received by the terminal device, and the bandwidth supported by the terminal device includes one or more bandwidths.

The bandwidth supported by the terminal device may be referred to as a radio frequency bandwidth of the terminal device or a channel bandwidth or a filter bandwidth of the terminal device.

The bandwidth may refer to one of a quantity of subcarriers, a bandwidth value, and a quantity of PRBs, and details are not limited.

Step 702: The network device receives the fifth indication information sent by the terminal device.

Step 703: The network device sends sixth indication information to the terminal device according to the fifth indication information, where the sixth indication information indicates a radio frequency bandwidth to be used by the terminal device and a location of the radio frequency bandwidth.

Specifically, after receiving the fifth indication information, the network device may determine, based on a BWP allocated to the terminal device and a downlink radio frequency bandwidth of the network device, a bandwidth that the terminal device is supposed to use and a location thereof, and a specific principle for determining is that the bandwidth to be used by the terminal device needs to include the BWP that is allocated to the terminal device by the network device, and the radio frequency bandwidth/the filter bandwidth to be used by the terminal device needs to be included in the downlink radio frequency bandwidth of the network device.

Herein, the sixth indication information may be sent by using an RRC message or other messages, and details are not limited.

Step 704: The terminal device receives the sixth indication information from the network device, and obtains, according to the sixth indication information, the radio frequency bandwidth to be used by the terminal device and the location of the radio frequency bandwidth.

Herein, the center frequency of the radio frequency bandwidth may refer to a center frequency value of the radio frequency bandwidth. The central PRB location may refer to a PRB number at a middle location of the radio frequency bandwidth, and if the middle location is between two PRBs, a larger PRB number may be selected. The central subcarrier location may refer to a subcarrier number at the middle location of the radio frequency bandwidth. The central absolute radio frequency channel number may be an absolute radio frequency channel number at the middle location of the radio frequency bandwidth. The lowest frequency may refer to a lowest frequency value of the radio frequency bandwidth. The lowest PRB location may refer to a minimum PRB number in the radio frequency bandwidth. The lowest subcarrier location may refer to a minimum subcarrier number in the radio frequency bandwidth. The lowest absolute radio frequency channel number may be a minimum absolute radio frequency channel number in the radio frequency bandwidth. The highest frequency may refer to a highest frequency value of the radio frequency bandwidth. The highest PRB location may refer to a maximum PRB number in the radio frequency bandwidth. The highest subcarrier location may refer to a maximum subcarrier number in the radio frequency bandwidth. The highest absolute radio frequency channel number may be a maximum absolute radio frequency channel number in the radio frequency bandwidth.

The center frequency of the radio frequency bandwidth may refer to a center frequency value of the radio frequency bandwidth. The central PRB may be a PRB at a middle location of the radio frequency bandwidth, and if the middle location is between two PRBs, a larger PRB number may be selected. The central subcarrier location is a subcarrier number. The lowest frequency may refer to a lowest frequency of the bandwidth; and the lowest PRB may refer to a minimum PRB number in the radio frequency bandwidth.

According to the foregoing method, the terminal device reports, to the network device, the bandwidth supported by the terminal device, and the network device determines, based on the BWP allocated to the terminal device and the downlink radio frequency bandwidth of the network device, the bandwidth that the terminal device is supposed to use and the location thereof, and sends the bandwidth and the location to the terminal device, so that the terminal device can receive a signal based on the bandwidth determined by the network device and the location thereof, and unnecessary interference caused by receiving an adjacent frequency signal can be effectively avoided.

For the foregoing method procedure, this application further provides a communications apparatus. For a specific implementation of the communications apparatus, refer to the foregoing method procedure.

Figure 8:
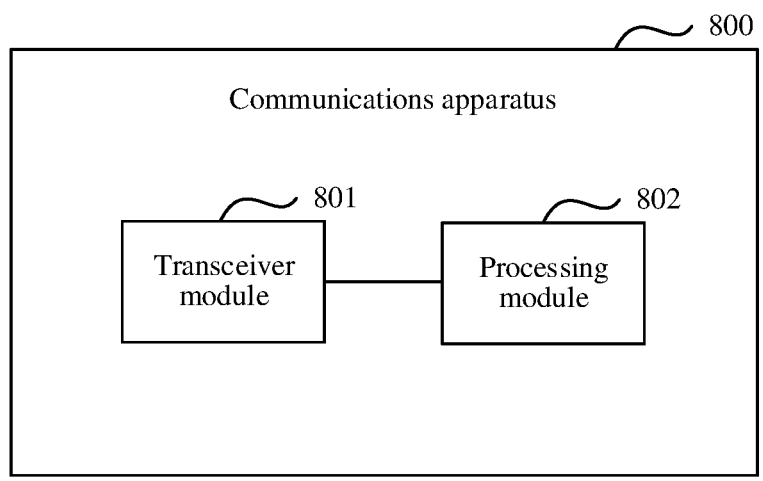
FIG. 8 is a schematic structural diagram of a communications apparatus according to an embodiment of this application.

Based on the same inventive concept, FIG. 8 is a schematic structural diagram of a communications apparatus according to this application. The communications apparatus includes: a transceiver module 801, configured to receive first power information and second power information from a network device; and a processing module 802, configured to determine a first maximum transmission power based on the first power information, and determine a second maximum transmission power based on the second power information, where the first maximum transmission power is a maximum transmission power to be used by the terminal device for transmitting a signal by a first radio access technology, and the second maximum transmission power is a maximum transmission power to be used by the terminal device for transmitting a signal by a second radio access technology.

In a possible design, the transceiver module 801 is further configured to: receive first indication information from the network device, where the first indication information indicates that the terminal device sends an uplink signal to the network device by using the first radio access technology and the second radio access technology in a TDM manner.

In a possible design, the processing module 802 is further configured to: in response to the first indication information, determine, based on the first power information, a transmission power of sending an uplink signal to the network device by using the first radio access technology, and/or determine, based on the second power information, a transmission power of sending an uplink signal to the network device by using the second radio access technology.

In a possible design, the transceiver module 801 is further configured to: receive second indication information from the network device, where the second indication information includes a DL-reference UL/DL configuration, a reference time division duplex configuration, or a reference UL/DL configuration; and the processing module 802 is further configured to: in response to the second indication information, determine, based on the first power information, a transmission power of sending an uplink signal to the network device by using the first radio access technology, and/or determine, based on the second power information, a transmission power of sending an uplink signal to the network device by using the second radio access technology.

In a possible design, the processing module 802 is specifically configured to: determine, based on the first maximum transmission power but not based on the second maximum transmission power, the transmission power of sending an uplink signal to the network device by using the first radio access technology; and/or determine, based on the second maximum transmission power but not based on the first maximum transmission power, the transmission power of sending an uplink signal to the network device by using the second radio access technology.

In a possible design, the processing module 802 is further configured to: if determining that a sum of the first maximum transmission power and the second maximum transmission power greater than a first threshold, determine, based on the first maximum transmission power but not based on the second maximum transmission power, a transmission power of sending an uplink signal to the network device by using the first radio access technology; and/or determine, based on the second maximum transmission power but not based on the first maximum transmission power, a transmission power of sending an uplink signal to the network device by using the second radio access technology.

In a possible design, the transceiver module 801 is further configured to: receive third indication information from the network device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

In a possible design, the processing module 802 is further configured to: in response to the third indication information, determine, based on the first power information, a transmission power of sending an uplink signal to the network device in the first time period by using the first radio access technology, and/or determine, based on the second power information, a transmission power of sending an uplink signal to the network device in the second time period by using the second radio access technology.

In a possible design, the processing module 802 is specifically configured to: determine, based on the first maximum transmission power but not based on the second maximum transmission power, the transmission power of sending an uplink signal to the network device in the first time period, and/or determine, based on the second maximum transmission power but not based on the first maximum transmission power, the transmission power of sending an uplink signal to the network device in the second time period.

In a possible design, the transceiver module 801 is further configured to: report an uplink power sharing capability of the terminal device to the network device, where the uplink power sharing capability includes supporting the sum of the first maximum transmission power and the second maximum transmission power greater than the first threshold, or not supporting the sum of the first maximum transmission power and the second maximum transmission power greater than the first threshold.

Figure 9:
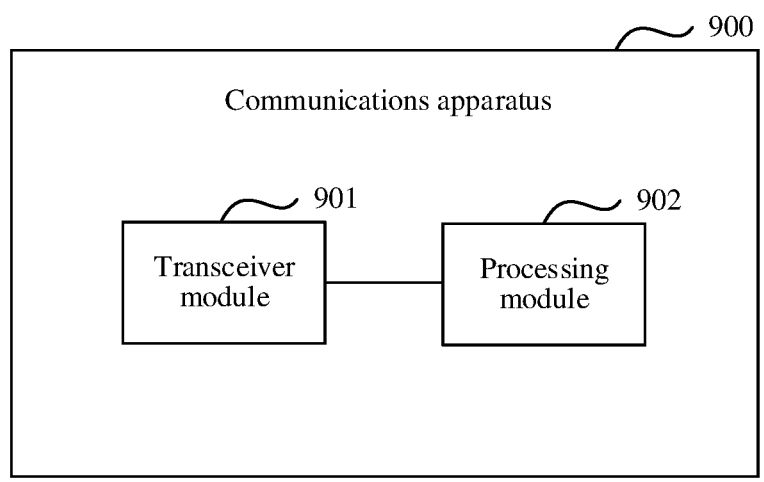
FIG. 9 is a schematic structural diagram of another communications apparatus according to an embodiment of this application.

FIG. 9 is a schematic structural diagram of a communications apparatus according to this application. As shown in FIG. 9, the communications apparatus includes: a processing module 902, configured to determine first power information and second power information; and a transceiver module 901, configured to send the first power information and the second power information to a terminal device, where the first power information is usable for the terminal device to determine a maximum transmit power for transmitting a signal by a first radio access technology, and the second power information is usable for the terminal device to determine a maximum transmission power for transmitting a signal by a second radio access technology.

In a possible design, the transceiver module 901 is further configured to: send first indication information to the terminal device, where the first indication information indicates that the terminal device sends an uplink signal to the network device by using the first radio access technology and the second radio access technology in a time division multiplex TDM manner.

In a possible design, the transceiver module 901 is further configured to: send second indication information to the terminal device, where the second indication information includes a DL-reference UL/DL configuration, a reference time division duplex configuration, or a reference UL/DL configuration; and in response to the second indication information, the second indication information is to be used by the terminal device to determine, based on the first power information, a transmission power of sending an uplink signal to the network device by using the first radio access technology, and/or determine, based on the second power information, a transmission power of sending an uplink signal to the network device by using the second radio access technology.

In a possible design, the transceiver module 901 is further configured to:

send third indication information to the terminal device, where the third indication information indicates a first time period and/or a second time period; and the first time period includes a time period in which the terminal device performs uplink communication with the network device by using the first radio access technology, and the second time period includes a time period in which the terminal device performs uplink communication with the network device by using the second radio access technology.

In a possible design, the transceiver module 901 is further configured to: receive an uplink power sharing capability of the terminal device that is reported by the terminal device, where the uplink power sharing capability includes supporting a sum of the first maximum transmission power and the second maximum transmission power greater than a first threshold, or not supporting a sum of the first maximum transmission power and the second maximum transmission power greater than the first threshold.

It should be noted that, in this embodiment of this application, module division is an example, and is merely a logical function division. In an actual implementation, another division manner may be used. Function modules in this embodiment of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

Figure 10:
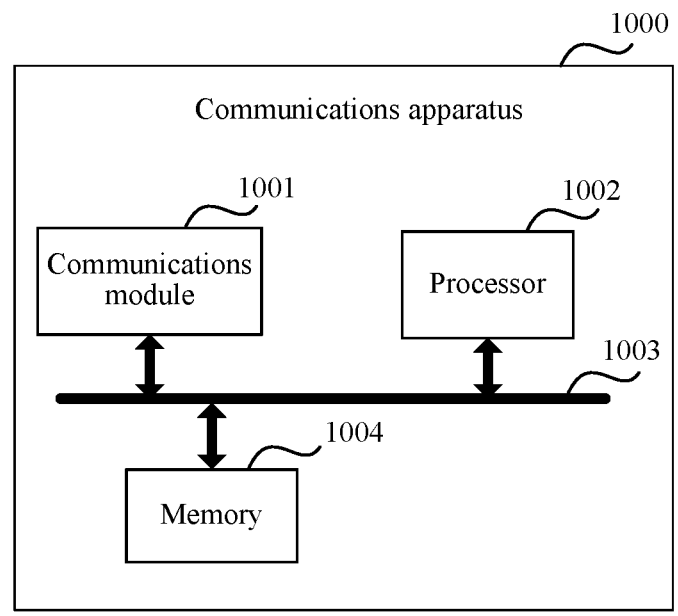
FIG. 10 is a schematic structural diagram of another communications apparatus according to an embodiment of this application.

Based on the foregoing embodiments, this application further provides a communications apparatus 1000, and the communications apparatus may be a terminal device, configured to implement corresponding procedures or steps performed by the terminal device in the method embodiments shown in FIG. 2 to FIG. 7. The communications apparatus has the function of the communications apparatus 800 shown in FIG. 8. Referring to FIG. 10, the communications apparatus 1000 includes: a communications module 1001 and a processor 1002.

The communications module 1001 is configured to perform communication interaction with other devices.

The communications module 1001 may be an RF circuit, a Wi-Fi module, a communications interface, a Bluetooth module, or the like.

The processor 1002 is configured to implement the function of the processing module in the third aspect.

Optionally, the communications apparatus 1000 may further include: a memory 1004, configured to store a program and the like. Specifically, the program may include program code, where the program code includes an instruction. The memory 1004 may include a RAM, and may further include a non-volatile memory, for example, at least one magnetic disk memory. The processor 1002 executes the application program stored in the memory 1004, to implement the foregoing function.

In a possible implementation, the communications module 1001, the processor 1002, and the memory 1004 are in communication connection with each other. For example, the communications module 1001, the processor 1002, and the memory 1004 may be connected to each other by using a bus 1003. The bus 1003 may be a PCI bus or an EISA bus, or the like. The bus may be classified into an address bus, a data bus, a control bus, and the like. For ease of representation, only one thick line is used to represent the bus in FIG. 10, but this does not mean that there is only one bus or only one type of bus.

Figure 11:
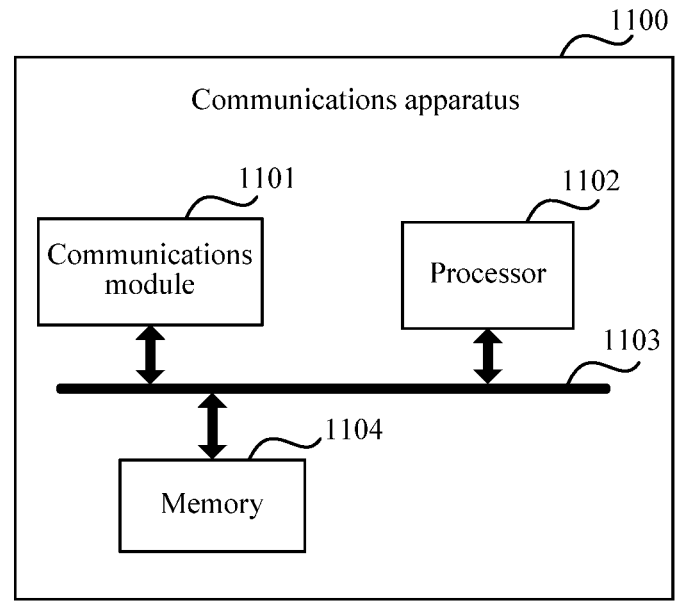
FIG. 11 is a schematic structural diagram of another communications apparatus according to an embodiment of this application.

Based on the foregoing embodiments, this application further provides a communications apparatus, and the communications apparatus may be a network device, configured to implement corresponding procedures or steps performed by the network device in the method embodiments shown in FIG. 2 to FIG. 7. The communications apparatus has the function of the communications apparatus 900 shown in FIG. 9. Referring to FIG. 11, the communications apparatus 1100 includes: a communications module 1101 and a processor 1102.

The processor 1102 is configured to implement the function of the processing module in the fourth aspect.

The communications module 1101 is configured to perform communication interaction with other devices.

The communications module 1101 may be an RF circuit, a Wi-Fi module, a communications interface, a Bluetooth module, or the like.

Optionally, the communications apparatus 1100 may further include: a memory 1104, configured to store a program and the like. Specifically, the program may include program code, where the program code includes an instruction. The memory 1104 may include a RAM, and may further include a non-volatile memory, for example, at least one magnetic disk memory. The processor 1102 executes the application program stored in the memory 1104, to implement the foregoing function.

In a possible implementation, the communications module 1101, the processor 1102, and the memory 1104 are in communication connection with each other. For example, the communications module 1101, the processor 1102, and the memory 1104 can be connected to each other by using a bus 1103. The bus 1103 may be a PCI bus or an EISA bus, or the like. The bus may be classified into an address bus, a data bus, a control bus, and the like. For ease of representation, only one thick line is used to represent the bus in FIG. 1i, but this does not mean that there is only one bus or only one type of bus.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Apparently, a person skilled in the art can make various modifications and variations to the embodiments of the present invention without departing from the spirit and scope of this application. This application is intended to cover these modifications and variations provided that they fall within the scope of protection defined by the following claims and their equivalent technologies.

What is claimed is:

1. A method, comprising:
    receiving, by a terminal device from a network device, first power information and second power information;
    determining, by the terminal device, a first maximum transmission power based on the first power information, wherein the first maximum transmission power is a configured maximum transmission power allowed for the terminal device to transmit a signal using a first radio access technology;
    determining, by the terminal device, a second maximum transmission power based on the second power information, wherein the second maximum transmission power is a configured maximum transmission power allowed for the terminal device to transmit a signal using a second radio access technology; and
    in response to a sum of the configured first maximum transmission power and the configured second maximum transmission power being greater than a first threshold, utilizing, by the terminal device, a time division manner to send uplink signals to the network device using the first radio access technology and the second radio access technology; and
    wherein the first radio access technology is a new radio (NR) technology, and the second radio access technology is a long term evolution (LTE) technology.

2. The method according to claim 1, wherein in response to the sum of the first maximum transmission power and the second maximum transmission power being greater than the first threshold, sending, by the terminal device, the uplink signals to the network device using the first radio access technology and the second radio access technology in the time division manner comprises:
    in response to the sum of the first maximum transmission power and the second maximum transmission power being greater than the first threshold, and the terminal device not supporting the sum of the first maximum transmission power and the second maximum transmission power, sending the uplink signals to the network device using the first radio access technology and the second radio access technology in the time division manner.

3. The method according to claim 1, wherein the first threshold is equal to or less than a maximum transmission power of the terminal device.

4. The method according to claim 1, wherein the first power information and the second power information are received using the second radio access technology.

5. A method, comprising:
    determining, by a network device, first power information and second power information;
    sending, by the network device, the first power information and the second power information to a terminal device, wherein the first power information enables the terminal device to determine, based on the first power information, a first maximum transmission power allowed for the terminal device to transmit a signal using a first radio access technology, and the second power information enables the terminal device to determine, based on the second power information, a second maximum transmission power allowed for the terminal device to transmit a signal using a second radio access technology, the first maximum transmission power and the second maximum transmission power configured by the network device; and
    receiving, by the network device, uplink signals from the terminal device using the first radio access technology and the second radio access technology in a time division manner, wherein the terminal device utilizes the time division manner to send the uplink signals using the first radio access technology and the second radio access technology in response to a sum of the configured first maximum transmission power and the configured second maximum transmission power being greater than a first threshold; and wherein the first radio access technology is a new radio (NR) technology, and the second radio access technology is a long term evolution (LTE) technology.

6. The method according to claim 5, wherein the first power information and the second power information are sent using the second radio access technology.

7. An apparatus, comprising:
a transceiver, configured to receive first power information and second power information from a network device; and
a processor, configured to:
 determine a first maximum transmission power based on the first power information, wherein the first maximum transmission power is a configured maximum transmission power allowed for transmitting a signal using a first radio access technology; and
 determine a second maximum transmission power based on the second power information, wherein the second maximum transmission power is a configured maximum transmission power allowed for transmitting a signal using a second radio access technology; and
wherein the transceiver is further configured to:
 in response to a sum of the configured first maximum transmission power and the configured second maximum transmission power being greater than a first threshold, utilize a time division manner to send uplink signals to the network device using the first radio access technology and the second radio access technology; and
wherein the first radio access technology is a new radio (NR) technology, and the second radio access technology is a long term evolution (LTE) technology.

8. The apparatus according to claim 7, wherein the transceiver being configured to, in response to the sum of the first maximum transmission power and the second maximum transmission power being greater than the first threshold, send the uplink signals to the network device using the first radio access technology and the second radio access technology in the time division manner comprises the transceiver being configured to:
 in response to the sum of the first maximum transmission power and the second maximum transmission power being greater than the first threshold, and the apparatus not supporting the sum of the first maximum transmission power and the second maximum transmission power, send the uplink signals to the network device by the first radio access technology and the second radio access technology in the time division manner.

9. The apparatus according to claim 7, wherein the first threshold is equal to or less than a maximum transmission power of the apparatus.

10. The apparatus according to claim 7, wherein the first power information and the second power information are received via a radio resource control message.

11. The apparatus according to claim 7, wherein the transceiver is configured to receive the first power information and the second power information using the second radio access technology.

12. An apparatus, comprising:
a processor, configured to determine first power information and second power information; and
a transceiver, configured to:
 send the first power information and the second power information to a terminal device, wherein the first power information enables the terminal device to determine, based on the first power information, a first maximum transmission power allowed for transmitting a signal using a first radio access technology, and the second power information enables the terminal device to determine, based on the second power information, a second maximum transmission power allowed for transmitting a signal using a second radio access technology, the first maximum transmission power and the second maximum transmission power configured by a network; and
 receive uplink signals from the terminal device using the first radio access technology and the second radio access technology in a time division manner, wherein the time division manner is utilized by the terminal device to send the uplink signals in response to a sum of the configured first maximum transmission power and the configured second maximum transmission power being greater than a first threshold; and
wherein the first radio access technology is a new radio (NR) technology, and the second radio access technology is a long term evolution (LTE) technology.

13. The apparatus according to claim 12, wherein the first power information and the second power information are carried in a radio resource control message.

14. The apparatus according to claim 13, wherein the transceiver is configured to send the first power information and the second power information using the second radio access technology.

15. A non-transitory computer-readable medium having instructions stored thereon, wherein the instructions comprise instructions for:
receiving first power information and second power information from a network device;
determining a first maximum transmission power based on the first power information, wherein the first maximum transmission power is a configured maximum transmission power allowed for a terminal device to transmit a signal using a first radio access technology;
determining a second maximum transmission power based on the second power information, wherein the second maximum transmission power is a configured maximum transmission power allowed for the terminal device to transmit a signal using a second radio access technology; and
in response to a sum of the configured first maximum transmission power and the configured second maximum transmission power being greater than a first threshold, utilizing a time division manner to send uplink signals to the network device using the first radio access technology and the second radio access technology; and
wherein the first radio access technology is a new radio (NR) technology, and the second radio access technology is a long term evolution (LTE) technology.

16. A non-transitory computer-readable medium having instructions stored thereon, wherein the instructions comprise instructions for:
determining first power information and second power information;
sending the first power information and the second power information to a terminal device, wherein the first power information enables the terminal device to determine, based on one the first power information, a first maximum transmission power allowed for transmitting a signal using a first radio access technology, and the second power information enables the terminal device to determine, based on the second power information, a second maximum transmission power allowed for transmitting a signal using a second radio access technology, the first maximum transmission power and the second maximum transmission power configured by a network; and receiving uplink signals from the terminal device using the first radio access technology and the second radio access technology in a time division manner, wherein the time division manner is utilized by the terminal device to send the uplink signals in response to a sum of the configured first maximum transmission power and the configured second maximum transmission power being greater than a first threshold; and wherein the first radio access technology is a new radio (NR) technology, and the second radio access technology is a long term evolution (LTE) technology.

17. A communication system, comprising:
a network device; and
a terminal device;
wherein the network device is configured to send first power information and second power information to the terminal device; and wherein the terminal device is configured to:
receive the first power information and the second power information;
determine a first maximum transmission power based on the first power information, wherein the first maximum transmission power is a configured maximum transmission power allowed for the terminal device to transmit a signal using a first radio access technology;
determine a second maximum transmission power based on the second power information, wherein the second maximum transmission power is a configured maximum transmission power allowed for the terminal device to transmit a signal using a second radio access technology; and
in response to a sum of the configured first maximum transmission power and the configured second maximum transmission power being greater than a first threshold, utilize a time division manner to send uplink signals to the network device using the first radio access technology and the second radio access technology; and wherein the first radio access technology is a new radio (NR) technology, and the second radio access technology is a long term evolution (LTE) technology.

* * * * *

UNITED STATES PATENT AND TRADEMARK OFFICE
CERTIFICATE OF CORRECTION

PATENT NO. : 11,496,972 B2
APPLICATION NO. : 16/881936
DATED : November 8, 2022
INVENTOR(S) : Zhiheng Guo et al.

It is certified that error appears in the above-identified patent and that said Letters Patent is hereby corrected as shown below:

In the Specification

In the Detailed Description of Illustrative Embodiments, Column 19, Lines 54 and 59; delete "o" and insert --0--.

In the Detailed Description of Illustrative Embodiments, Column 25, Line 49; delete "flies" and insert --1 lies--.

In the Detailed Description of Illustrative Embodiments, Column 27, Line 5; insert --lies-- between "1" and "in".

In the Detailed Description of Illustrative Embodiments, Column 29, Line 22; insert --lies-- between "1" and "in".

In the Detailed Description of Illustrative Embodiments, Column 38, Line 54; delete "1$i$" and insert --11--.

Signed and Sealed this
Thirteenth Day of December, 2022

Katherine Kelly Vidal
*Director of the United States Patent and Trademark Office*